US 11,425,189 B2

(12) United States Patent
Link

(10) Patent No.: US 11,425,189 B2
(45) Date of Patent: Aug. 23, 2022

(54) TARGET INTENT-BASED CLOCK SPEED DETERMINATION AND ADJUSTMENT TO LIMIT TOTAL HEAT GENERATED BY MULTIPLE PROCESSORS

(71) Applicant: Magic Leap, Inc., Plantation, FL (US)

(72) Inventor: Gregory Michael Link, Half Moon Bay, CA (US)

(73) Assignee: Magic Leap, Inc., Plantation, FL (US)

( * ) Notice: Subject to any disclaimer, the term of this patent is extended or adjusted under 35 U.S.C. 154(b) by 146 days.

(21) Appl. No.: 16/783,866

(22) Filed: Feb. 6, 2020

(65) Prior Publication Data

US 2020/0252448 A1    Aug. 6, 2020

Related U.S. Application Data

(60) Provisional application No. 62/802,140, filed on Feb. 6, 2019.

(51) Int. Cl.
| | | |
|---|---|---|
| *H04L 29/08* | (2006.01) | |
| *H04L 67/10* | (2022.01) | |
| *G06F 1/08* | (2006.01) | |
| *G06F 1/324* | (2019.01) | |
| *G06F 1/3209* | (2019.01) | |

(52) U.S. Cl.
CPC .............. *H04L 67/10* (2013.01); *G06F 1/08* (2013.01); *G06F 1/324* (2013.01); *G06F 1/3209* (2013.01)

(58) Field of Classification Search
CPC ..... H04L 67/10; H04L 1/0044; H04L 1/0053; H04L 9/003; H04L 47/70; G06F 1/08; G06F 1/189; G06F 1/3203; G06F 9/28; G06F 1/10; G06F 1/26; G06F 1/324; G06F 1/3209; G06F 1/3293; H04W 52/04; H04W 40/08; H04W 52/00; H04W 52/02

USPC .......................................................... 709/217
See application file for complete search history.

(56) References Cited

U.S. PATENT DOCUMENTS

| | | |
|---|---|---|
| 4,344,092 A | 8/1982 | Miller |
| 4,652,930 A | 3/1987 | Crawford |
| 4,810,080 A | 3/1989 | Grendol et al. |

(Continued)

FOREIGN PATENT DOCUMENTS

| | | |
|---|---|---|
| CN | 107683497 A1 | 2/2018 |
| EP | 0535402 A1 | 4/1993 |

(Continued)

OTHER PUBLICATIONS

Dermer et al., "Apparatus and method for power throttling in a microprocessor using a closed loop feedback system", 2002 (Year: 2002).*

(Continued)

*Primary Examiner* — Nam T Tran
(74) *Attorney, Agent, or Firm* — Stephen M. De Klerk

(57) ABSTRACT

A power profile library includes a plurality of power profiles with each power profile having a plurality of maximum clock speeds for respective processors. The maximum clock speeds of each power profile are selected to limit a maximum amount of heat per unit time generated by the processors in combination. A developer computer system selects sections of an eventual application for a consumer device and a target intent for each section. A power profile lookup uses the target intents to determine a power profile for each section.

17 Claims, 7 Drawing Sheets

(56) References Cited

U.S. PATENT DOCUMENTS

| | | | |
|---|---|---|---|
| 4,997,268 A | 3/1991 | Dauvergne | |
| 5,007,727 A | 4/1991 | Kahaney et al. | |
| 5,074,295 A | 12/1991 | Willis | |
| 5,240,220 A | 8/1993 | Elberbaum | |
| 5,251,635 A | 10/1993 | Dumoulin et al. | |
| 5,410,763 A | 5/1995 | Bolle | |
| 5,455,625 A | 10/1995 | Englander | |
| 5,495,286 A | 2/1996 | Adair | |
| 5,497,463 A | 3/1996 | Stein et al. | |
| 5,682,255 A | 10/1997 | Friesem et al. | |
| 5,826,092 A * | 10/1998 | Flannery | G06F 1/32 713/324 |
| 5,854,872 A | 12/1998 | Tai | |
| 5,864,365 A | 1/1999 | Sramek et al. | |
| 5,937,202 A * | 8/1999 | Crosetto | G06F 15/803 712/19 |
| 6,012,811 A | 1/2000 | Chao et al. | |
| 6,016,160 A | 1/2000 | Coombs et al. | |
| 6,076,927 A | 6/2000 | Owens | |
| 6,117,923 A | 9/2000 | Amagai et al. | |
| 6,124,977 A | 9/2000 | Takahashi | |
| 6,191,809 B1 | 2/2001 | Hori et al. | |
| 6,375,369 B1 | 4/2002 | Schneider et al. | |
| 6,385,735 B1 * | 5/2002 | Wilson | G06F 1/08 713/501 |
| 6,538,655 B1 | 3/2003 | Kubota | |
| 6,541,736 B1 | 4/2003 | Huang et al. | |
| 6,757,068 B2 | 6/2004 | Foxlin | |
| 7,046,515 B1 * | 5/2006 | Wyatt | G06F 1/203 165/121 |
| 7,051,219 B2 * | 5/2006 | Hwang | G06F 1/324 713/320 |
| 7,076,674 B2 * | 7/2006 | Cervantes | G06F 1/324 713/310 |
| 7,111,290 B1 * | 9/2006 | Yates, Jr. | G06F 9/45554 717/158 |
| 7,119,819 B1 | 10/2006 | Robertson et al. | |
| 7,219,245 B1 * | 5/2007 | Raghuvanshi | G06F 1/324 713/322 |
| 7,431,453 B2 | 10/2008 | Hogan | |
| 7,542,040 B2 | 6/2009 | Templeman | |
| 7,573,640 B2 | 8/2009 | Nivon et al. | |
| 7,751,662 B2 | 7/2010 | Kleemann | |
| 7,758,185 B2 | 7/2010 | Lewis | |
| 8,060,759 B1 * | 11/2011 | Arnan | G06F 1/3203 713/323 |
| 8,214,660 B2 * | 7/2012 | Capps, Jr. | G06F 1/206 713/300 |
| 8,246,408 B2 | 8/2012 | Elliot | |
| 8,353,594 B2 | 1/2013 | Lewis | |
| 8,508,676 B2 | 8/2013 | Silverstein et al. | |
| 8,547,638 B2 | 10/2013 | Levola | |
| 8,605,764 B1 | 10/2013 | Rothaar et al. | |
| 8,619,365 B2 | 12/2013 | Harris et al. | |
| 8,696,113 B2 | 4/2014 | Lewis | |
| 8,733,927 B1 | 5/2014 | Lewis | |
| 8,736,636 B2 | 5/2014 | Kang | |
| 8,759,929 B2 | 6/2014 | Shiozawa et al. | |
| 8,793,770 B2 | 7/2014 | Lim | |
| 8,823,855 B2 | 9/2014 | Hwang | |
| 8,847,988 B2 | 9/2014 | Geisner et al. | |
| 8,874,673 B2 | 10/2014 | Kim | |
| 9,010,929 B2 | 4/2015 | Lewis | |
| 9,015,501 B2 * | 4/2015 | Gee | G06F 1/3243 713/300 |
| 9,095,437 B2 | 8/2015 | Boyden et al. | |
| 9,239,473 B2 | 1/2016 | Lewis | |
| 9,244,293 B2 | 1/2016 | Lewis | |
| 9,244,533 B2 | 1/2016 | Friend et al. | |
| 9,383,823 B2 | 7/2016 | Geisner et al. | |
| 9,489,027 B1 * | 11/2016 | Ogletree | G06F 1/3203 |
| 9,519,305 B2 * | 12/2016 | Wolfe | G06F 1/08 |
| 9,581,820 B2 | 2/2017 | Robbins | |
| 9,582,060 B2 * | 2/2017 | Balatsos | G06F 1/3203 |
| 9,658,473 B2 | 5/2017 | Lewis | |
| 9,671,566 B2 | 6/2017 | Abovitz et al. | |
| 9,671,615 B1 | 6/2017 | Vallius et al. | |
| 9,696,795 B2 | 7/2017 | Marcolina et al. | |
| 9,874,664 B2 | 1/2018 | Stevens et al. | |
| 9,955,862 B2 | 5/2018 | Freeman et al. | |
| 9,978,118 B1 | 5/2018 | Ozgumer et al. | |
| 9,996,797 B1 | 6/2018 | Holz et al. | |
| 10,018,844 B2 | 7/2018 | Levola et al. | |
| 10,151,937 B2 | 12/2018 | Lewis | |
| 10,185,147 B2 | 1/2019 | Lewis | |
| 10,218,679 B1 | 2/2019 | Jawahar | |
| 10,436,594 B2 | 10/2019 | Belt et al. | |
| 10,516,853 B1 | 12/2019 | Gibson et al. | |
| 10,551,879 B1 | 2/2020 | Richards et al. | |
| 10,578,870 B2 | 3/2020 | Kimmel | |
| 10,698,202 B2 | 6/2020 | Kimmel et al. | |
| 10,856,107 B2 | 10/2020 | Mycek et al. | |
| 10,825,424 B2 | 11/2020 | Zhang | |
| 11,190,681 B1 | 11/2021 | Brook et al. | |
| 11,209,656 B1 | 12/2021 | Choi et al. | |
| 11,236,993 B1 | 2/2022 | Hall et al. | |
| 2001/0010598 A1 | 8/2001 | Aritake et al. | |
| 2002/0007463 A1 * | 1/2002 | Fung | G06F 1/3209 713/320 |
| 2002/0063913 A1 | 5/2002 | Nakamura et al. | |
| 2002/0071050 A1 | 6/2002 | Homberg | |
| 2002/0108064 A1 * | 8/2002 | Nunally | G06F 1/324 713/300 |
| 2002/0122648 A1 | 9/2002 | Mule' et al. | |
| 2002/0140848 A1 | 10/2002 | Cooper et al. | |
| 2003/0028816 A1 * | 2/2003 | Bacon | G06F 1/329 713/500 |
| 2003/0048456 A1 | 3/2003 | Hill | |
| 2003/0067685 A1 | 4/2003 | Niv | |
| 2003/0077458 A1 | 4/2003 | Korenaga et al. | |
| 2003/0115494 A1 * | 6/2003 | Cervantes | G06F 1/324 713/322 |
| 2003/0219992 A1 | 11/2003 | Schaper | |
| 2003/0226047 A1 * | 12/2003 | Park | G06F 1/329 713/300 |
| 2004/0001533 A1 * | 1/2004 | Tran | G06F 1/10 375/141 |
| 2004/0021600 A1 | 2/2004 | Wittenberg | |
| 2004/0025069 A1 | 2/2004 | Gary et al. | |
| 2004/0042377 A1 | 3/2004 | Nikoloai et al. | |
| 2004/0073822 A1 * | 4/2004 | Greco | G06F 1/3203 713/320 |
| 2004/0073825 A1 * | 4/2004 | Itoh | G06F 1/08 713/323 |
| 2004/0111248 A1 | 6/2004 | Granny et al. | |
| 2004/0174496 A1 | 9/2004 | Ji et al. | |
| 2004/0186902 A1 | 9/2004 | Stewart | |
| 2004/0201857 A1 | 10/2004 | Foxlin | |
| 2004/0238732 A1 | 12/2004 | State et al. | |
| 2004/0240072 A1 | 12/2004 | Schindler et al. | |
| 2004/0246391 A1 | 12/2004 | Travis | |
| 2004/0268159 A1 | 12/2004 | Aasheim et al. | |
| 2005/0001977 A1 | 1/2005 | Zelman | |
| 2005/0034002 A1 * | 2/2005 | Flautner | G06F 1/329 713/322 |
| 2005/0157159 A1 | 7/2005 | Komiya et al. | |
| 2005/0177385 A1 * | 8/2005 | Hull | G06Q 50/01 705/319 |
| 2005/0273792 A1 | 12/2005 | Inohara et al. | |
| 2006/0013435 A1 | 1/2006 | Rhoads | |
| 2006/0015821 A1 | 1/2006 | Jacques Parker et al. | |
| 2006/0019723 A1 * | 1/2006 | Vorenkamp | H04W 52/0258 455/574 |
| 2006/0038880 A1 | 2/2006 | Starkweather et al. | |
| 2006/0050224 A1 | 3/2006 | Smith | |
| 2006/0090092 A1 * | 4/2006 | Verhulst | G06F 1/12 713/400 |
| 2006/0126181 A1 | 6/2006 | Levola | |
| 2006/0129852 A1 * | 6/2006 | Bonola | G06F 1/3296 713/300 |
| 2006/0132914 A1 | 6/2006 | Weiss et al. | |

(56) References Cited

U.S. PATENT DOCUMENTS

| | | | |
|---|---|---|---|
| 2006/0179329 A1* | 8/2006 | Terechko | G06F 1/3203 713/300 |
| 2006/0221448 A1 | 10/2006 | Nivon et al. | |
| 2006/0228073 A1 | 10/2006 | Mukawa et al. | |
| 2006/0250322 A1 | 11/2006 | Hall et al. | |
| 2006/0259621 A1* | 11/2006 | Ranganathan | H04L 67/22 709/226 |
| 2006/0268220 A1 | 11/2006 | Hogan | |
| 2007/0058248 A1 | 3/2007 | Nguyen et al. | |
| 2007/0103836 A1* | 5/2007 | Oh | G06F 1/3275 361/115 |
| 2007/0124730 A1* | 5/2007 | Pytel | G06F 11/3442 718/100 |
| 2007/0159673 A1 | 7/2007 | Freeman et al. | |
| 2007/0188837 A1 | 8/2007 | Shimizu et al. | |
| 2007/0198886 A1* | 8/2007 | Saito | G06F 13/1694 714/749 |
| 2007/0204672 A1 | 9/2007 | Huang et al. | |
| 2007/0213952 A1 | 9/2007 | Cirelli | |
| 2007/0283247 A1 | 12/2007 | Brenneman et al. | |
| 2008/0002259 A1 | 1/2008 | Ishizawa et al. | |
| 2008/0002260 A1 | 1/2008 | Arrouy et al. | |
| 2008/0043334 A1 | 2/2008 | Itzkovitch et al. | |
| 2008/0046773 A1* | 2/2008 | Ham | G06F 1/324 713/500 |
| 2008/0063802 A1 | 3/2008 | Maula et al. | |
| 2008/0068557 A1 | 3/2008 | Menduni et al. | |
| 2008/0146942 A1 | 6/2008 | Dala-Krishna | |
| 2008/0173036 A1* | 7/2008 | Williams | F25B 9/04 62/259.2 |
| 2008/0177506 A1* | 7/2008 | Kim | G06F 11/24 702/186 |
| 2008/0205838 A1 | 8/2008 | Crippa et al. | |
| 2008/0215907 A1* | 9/2008 | Wilson | H03L 7/1974 713/500 |
| 2008/0316768 A1 | 12/2008 | Travis | |
| 2009/0153797 A1 | 6/2009 | Allon et al. | |
| 2009/0224416 A1 | 9/2009 | Laakkonen et al. | |
| 2009/0245730 A1 | 10/2009 | Kleemann | |
| 2009/0310633 A1 | 12/2009 | Ikegami | |
| 2010/0005326 A1* | 1/2010 | Archer | G06F 1/32 713/320 |
| 2010/0056274 A1 | 3/2010 | Uusitalo et al. | |
| 2010/0063854 A1 | 3/2010 | Purvis et al. | |
| 2010/0079841 A1 | 4/2010 | Levola | |
| 2010/0153934 A1 | 6/2010 | Lachner | |
| 2010/0194632 A1* | 8/2010 | Raento | H04W 4/02 342/357.25 |
| 2010/0232016 A1 | 9/2010 | Landa et al. | |
| 2010/0232031 A1 | 9/2010 | Batchko et al. | |
| 2010/0244168 A1 | 9/2010 | Shiozawa et al. | |
| 2010/0296163 A1 | 11/2010 | Sarikko | |
| 2011/0021263 A1 | 1/2011 | Anderson et al. | |
| 2011/0022870 A1* | 1/2011 | McGrane | G06F 1/324 713/340 |
| 2011/0050655 A1 | 3/2011 | Mukawa | |
| 2011/0122240 A1 | 5/2011 | Becker | |
| 2011/0145617 A1* | 6/2011 | Thomson | G06F 1/3203 713/323 |
| 2011/0170801 A1 | 7/2011 | Lu et al. | |
| 2011/0218733 A1 | 9/2011 | Hamza et al. | |
| 2011/0286735 A1 | 11/2011 | Temblay | |
| 2011/0291969 A1 | 12/2011 | Rashid et al. | |
| 2012/0011389 A1* | 1/2012 | Driesen | G06F 1/324 713/600 |
| 2012/0050535 A1 | 3/2012 | Densham et al. | |
| 2012/0075501 A1 | 3/2012 | Oyagi et al. | |
| 2012/0081392 A1 | 4/2012 | Arthur | |
| 2012/0089854 A1* | 4/2012 | Breakstone | G06F 3/0625 713/323 |
| 2012/0113235 A1 | 5/2012 | Shintani | |
| 2012/0127062 A1 | 5/2012 | Bar-Zeev et al. | |
| 2012/0154557 A1 | 6/2012 | Perez et al. | |
| 2012/0218301 A1 | 8/2012 | Miller | |
| 2012/0246506 A1* | 9/2012 | Knight | G06F 11/3024 713/340 |
| 2012/0249416 A1 | 10/2012 | Maciocci et al. | |
| 2012/0249741 A1 | 10/2012 | Maciocci et al. | |
| 2012/0260083 A1* | 10/2012 | Andrews | G06F 1/324 713/100 |
| 2012/0307075 A1 | 12/2012 | Margalitq | |
| 2012/0307362 A1 | 12/2012 | Silverstein et al. | |
| 2012/0314959 A1 | 12/2012 | White et al. | |
| 2012/0320460 A1 | 12/2012 | Levola | |
| 2012/0326948 A1 | 12/2012 | Crocco et al. | |
| 2013/0021486 A1 | 1/2013 | Richardon | |
| 2013/0050833 A1 | 2/2013 | Lewis et al. | |
| 2013/0051730 A1 | 2/2013 | Travers et al. | |
| 2013/0502058 | 2/2013 | Liu et al. | |
| 2013/0077049 A1 | 3/2013 | Bohn | |
| 2013/0077170 A1 | 3/2013 | Ukuda | |
| 2013/0094148 A1 | 4/2013 | Sloane | |
| 2013/0129282 A1 | 5/2013 | Li | |
| 2013/0169923 A1 | 7/2013 | Schnoll et al. | |
| 2013/0205126 A1* | 8/2013 | Kruglick | G06F 1/3296 713/1 |
| 2013/0268257 A1* | 10/2013 | Hu | G06F 11/3062 703/22 |
| 2013/0278633 A1 | 10/2013 | Ahn et al. | |
| 2013/0318276 A1* | 11/2013 | Dalal | H04L 63/14 710/308 |
| 2013/0336138 A1 | 12/2013 | Venkatraman et al. | |
| 2013/0342564 A1 | 12/2013 | Kinnebrew et al. | |
| 2013/0342570 A1 | 12/2013 | Kinnebrew et al. | |
| 2013/0342571 A1 | 12/2013 | Kinnebrew et al. | |
| 2013/0343408 A1* | 12/2013 | Cook | H04L 67/10 370/474 |
| 2014/0013098 A1* | 1/2014 | Yeung | G06F 1/206 713/100 |
| 2014/0016821 A1 | 1/2014 | Arth et al. | |
| 2014/0022819 A1 | 1/2014 | Oh et al. | |
| 2014/0082526 A1 | 3/2014 | Park et al. | |
| 2014/0119598 A1 | 5/2014 | Ramachandran et al. | |
| 2014/0126769 A1 | 5/2014 | Reitmayr et al. | |
| 2014/0140653 A1 | 5/2014 | Brown et al. | |
| 2014/0149573 A1 | 5/2014 | Tofighbakhsh et al. | |
| 2014/0168260 A1 | 6/2014 | O'Brien et al. | |
| 2014/0267419 A1 | 9/2014 | Ballard et al. | |
| 2014/0274391 A1 | 9/2014 | Stafford | |
| 2014/0282105 A1 | 9/2014 | Nordstrom | |
| 2014/0359589 A1 | 12/2014 | Kodsky et al. | |
| 2015/0005785 A1 | 1/2015 | Olson | |
| 2015/0009099 A1 | 1/2015 | Queen | |
| 2015/0097719 A1 | 4/2015 | Balachandreswaran et al. | |
| 2015/0123966 A1 | 5/2015 | Newman | |
| 2015/0130790 A1 | 5/2015 | Vazquez, II et al. | |
| 2015/0134995 A1* | 5/2015 | Park | G06F 11/3058 713/340 |
| 2015/0138248 A1 | 5/2015 | Schrader | |
| 2015/0155939 A1 | 6/2015 | Oshima et al. | |
| 2015/0168221 A1 | 6/2015 | Mao et al. | |
| 2015/0205126 A1 | 7/2015 | Schowengerdt | |
| 2015/0235431 A1 | 8/2015 | Schowengerdt | |
| 2015/0253651 A1 | 9/2015 | Russell et al. | |
| 2015/0256484 A1 | 9/2015 | Cameron | |
| 2015/0269784 A1 | 9/2015 | Miyawaki et al. | |
| 2015/0294483 A1 | 10/2015 | Wells et al. | |
| 2015/0301955 A1 | 10/2015 | Yakovenko et al. | |
| 2015/0338915 A1 | 11/2015 | Publicover et al. | |
| 2015/0355481 A1 | 12/2015 | Hilkes et al. | |
| 2016/0004102 A1 | 1/2016 | Nisper et al. | |
| 2016/0027215 A1 | 1/2016 | Burns et al. | |
| 2016/0033770 A1 | 2/2016 | Fujimaki et al. | |
| 2016/0077338 A1 | 3/2016 | Robbins et al. | |
| 2016/0085285 A1* | 3/2016 | Mangione-Smith | G06F 11/0706 713/300 |
| 2016/0085300 A1 | 3/2016 | Robbins et al. | |
| 2016/0093099 A1 | 3/2016 | Bridges | |
| 2016/0093269 A1 | 3/2016 | Buckley et al. | |
| 2016/0123745 A1 | 5/2016 | Cotier et al. | |
| 2016/0155273 A1 | 6/2016 | Lyren et al. | |

(56) References Cited

U.S. PATENT DOCUMENTS

| | | |
|---|---|---|
| 2016/0180596 A1 | 6/2016 | Gonzalez del Rosario |
| 2016/0191887 A1 | 6/2016 | Casas |
| 2016/0202496 A1 | 7/2016 | Billetz et al. |
| 2016/0217624 A1 | 7/2016 | Finn et al. |
| 2016/0266412 A1 | 9/2016 | Yoshida |
| 2016/0267708 A1 | 9/2016 | Nistico et al. |
| 2016/0300388 A1 | 10/2016 | Stafford et al. |
| 2016/0321551 A1 | 11/2016 | Priness et al. |
| 2016/0327798 A1 | 11/2016 | Xiao et al. |
| 2016/0334279 A1 | 11/2016 | Mittleman et al. |
| 2016/0357255 A1 | 12/2016 | Lindh et al. |
| 2016/0370404 A1 | 12/2016 | Quadrat et al. |
| 2016/0370510 A1 | 12/2016 | Thomas |
| 2017/0038607 A1 | 2/2017 | Camara |
| 2017/0060225 A1* | 3/2017 | Zha .................. G06F 1/3293 |
| 2017/0061696 A1 | 3/2017 | Li et al. |
| 2017/0100664 A1 | 4/2017 | Osterhout et al. |
| 2017/0115487 A1 | 4/2017 | Travis |
| 2017/0122725 A1 | 5/2017 | Yeoh et al. |
| 2017/0127295 A1 | 5/2017 | Black et al. |
| 2017/0131569 A1 | 5/2017 | Aschwanden et al. |
| 2017/0147066 A1 | 5/2017 | Katz et al. |
| 2017/0160518 A1 | 6/2017 | Lanman et al. |
| 2017/0185261 A1 | 6/2017 | Perez et al. |
| 2017/0192239 A1 | 7/2017 | Nakamura et al. |
| 2017/0205903 A1 | 7/2017 | Miller et al. |
| 2017/0206668 A1 | 7/2017 | Poulos et al. |
| 2017/0213388 A1 | 7/2017 | Margolis et al. |
| 2017/0219841 A1 | 8/2017 | Popovich et al. |
| 2017/0232345 A1 | 8/2017 | Rofougaran et al. |
| 2017/0235126 A1 | 8/2017 | DiDomenico |
| 2017/0235142 A1 | 8/2017 | Wall et al. |
| 2017/0235144 A1 | 8/2017 | Piskunov et al. |
| 2017/0235147 A1 | 8/2017 | Kamakura |
| 2017/0243403 A1 | 8/2017 | Daniels et al. |
| 2017/0254832 A1 | 9/2017 | Ho et al. |
| 2017/0256096 A1 | 9/2017 | Faaborg et al. |
| 2017/0270712 A1 | 9/2017 | Tyson et al. |
| 2017/0281054 A1 | 10/2017 | Stever et al. |
| 2017/0287376 A1 | 10/2017 | Bakar et al. |
| 2017/0293141 A1 | 10/2017 | Schowengerdt et al. |
| 2017/0307886 A1 | 10/2017 | Stenberg et al. |
| 2017/0307891 A1 | 10/2017 | Bucknor et al. |
| 2017/0312032 A1 | 11/2017 | Amanatullah et al. |
| 2017/0329137 A1 | 11/2017 | Tervo |
| 2017/0332098 A1 | 11/2017 | Rusanovskyy et al. |
| 2017/0357332 A1 | 12/2017 | Balan et al. |
| 2017/0371394 A1* | 12/2017 | Chan .................. G06F 1/3218 |
| 2017/0371661 A1* | 12/2017 | Sparling .............. G06F 1/3296 |
| 2018/0014266 A1 | 1/2018 | Chen |
| 2018/0044173 A1 | 2/2018 | Netzer |
| 2018/0052007 A1 | 2/2018 | Teskey et al. |
| 2018/0052501 A1 | 2/2018 | Jones, Jr. et al. |
| 2018/0059305 A1 | 3/2018 | Popovich et al. |
| 2018/0067779 A1 | 3/2018 | Pillalamarri et al. |
| 2018/0070855 A1 | 3/2018 | Eichler |
| 2018/0082480 A1 | 3/2018 | White et al. |
| 2018/0088185 A1 | 3/2018 | Woods et al. |
| 2018/0102981 A1* | 4/2018 | Kurtzman ............ H04L 47/70 |
| 2018/0108179 A1 | 4/2018 | Tomlin et al. |
| 2018/0131907 A1 | 5/2018 | Schmirler et al. |
| 2018/0136466 A1 | 5/2018 | Ko |
| 2018/0151796 A1 | 5/2018 | Akahane |
| 2018/0188115 A1 | 7/2018 | Hsu et al. |
| 2018/0190017 A1 | 7/2018 | Mendez et al. |
| 2018/0191990 A1 | 7/2018 | Motoyama et al. |
| 2018/0250589 A1 | 9/2018 | Cossairt et al. |
| 2018/0284877 A1* | 10/2018 | Klein .................. G06N 5/04 |
| 2018/0357472 A1 | 12/2018 | Dreessen |
| 2019/0005069 A1 | 1/2019 | Filgueiras de Arajuo et al. |
| 2019/0011691 A1 | 1/2019 | Peyman |
| 2019/0056591 A1 | 2/2019 | Tervo et al. |
| 2019/0087015 A1 | 3/2019 | Lam et al. |
| 2019/0101758 A1 | 4/2019 | Zhu et al. |
| 2019/0158926 A1 | 5/2019 | Kang et al. |
| 2019/0172216 A1 | 6/2019 | Ninan et al. |
| 2019/0178654 A1 | 6/2019 | Hare |
| 2019/0196690 A1 | 6/2019 | Chong et al. |
| 2019/0219815 A1 | 7/2019 | Price et al. |
| 2019/0243123 A1 | 8/2019 | Bohn |
| 2019/0318540 A1 | 10/2019 | Piemonte et al. |
| 2019/0321728 A1 | 10/2019 | Imai et al. |
| 2019/0347853 A1 | 11/2019 | Chen et al. |
| 2020/0098188 A1 | 3/2020 | Bar-Zeev et al. |
| 2020/0110928 A1 | 4/2020 | Al Jazaery et al. |
| 2020/0117267 A1 | 4/2020 | Gibson et al. |
| 2020/0117270 A1 | 4/2020 | Gibson et al. |
| 2020/0202759 A1 | 6/2020 | Ukai et al. |
| 2020/0309944 A1 | 10/2020 | Thoresen et al. |
| 2020/0356161 A1 | 11/2020 | Wagner |
| 2020/0368616 A1 | 11/2020 | Delamont |
| 2020/0409528 A1 | 12/2020 | Lee |
| 2021/0008413 A1 | 1/2021 | Asikainen et al. |
| 2021/0033871 A1 | 2/2021 | Jacoby et al. |
| 2021/0041951 A1 | 2/2021 | Gibson et al. |
| 2021/0053820 A1 | 2/2021 | Gurin et al. |
| 2021/0142582 A1 | 5/2021 | Jones et al. |
| 2021/0158627 A1 | 5/2021 | Cossairt et al. |
| 2021/0173480 A1 | 6/2021 | Osterhout et al. |

FOREIGN PATENT DOCUMENTS

| | | | |
|---|---|---|---|
| EP | 0632360 A1 * | 1/1995 | ............. G06F 1/324 |
| EP | 1215522 A2 | 6/2002 | |
| EP | 1494110 A2 * | 1/2005 | ........... G06F 1/3203 |
| EP | 1938141 A1 | 7/2008 | |
| EP | 1943556 A2 | 7/2008 | |
| EP | 2290428 A2 | 3/2011 | |
| EP | 2350774 A1 * | 8/2011 | ............. G06F 9/542 |
| EP | 1237067 B1 * | 1/2016 | ........... G06F 1/3203 |
| EP | 3139245 A1 * | 3/2017 | ........... G06F 1/3296 |
| EP | 3164776 B1 | 5/2017 | |
| EP | 3236211 A1 | 10/2017 | |
| EP | 2723240 B1 | 8/2018 | |
| GB | 2499635 A | 8/2013 | |
| GB | 2542853 A * | 4/2017 | ......... G06F 13/1657 |
| JP | 2003-029198 A | 1/2003 | |
| JP | 2007-012530 A | 1/2007 | |
| JP | 2009-244869 A | 10/2009 | |
| JP | 2012-015774 A | 1/2012 | |
| JP | 2016-85463 A | 5/2016 | |
| JP | 6232763 B2 | 11/2017 | |
| JP | 6333965 B2 * | 5/2018 | ........... G06F 1/3206 |
| KR | 20050010775 A * | 1/2005 | ............. G06F 30/30 |
| KR | 101372623 B1 * | 3/2014 | ........... G06F 1/3203 |
| TW | 201803289 A | 1/2018 | |
| WO | 2002/071315 A2 | 9/2002 | |
| WO | WO-2004095248 A2 * | 11/2004 | ............. G06F 1/329 |
| WO | 2006132614 A1 | 12/2006 | |
| WO | 2007/085682 A1 | 8/2007 | |
| WO | 2007/102144 A1 | 9/2007 | |
| WO | 2008148927 A1 | 12/2008 | |
| WO | 2009/101238 A1 | 8/2009 | |
| WO | WO-2012030787 A2 * | 3/2012 | ............... G06F 1/26 |
| WO | 2013/049012 A1 | 4/2013 | |
| WO | WO-2013062701 A1 * | 5/2013 | ............. G06F 1/324 |
| WO | 2015143641 A1 | 10/2015 | |
| WO | 2016/054092 A1 | 4/2016 | |
| WO | 2017004695 A1 | 1/2017 | |
| WO | 2017120475 A1 | 7/2017 | |
| WO | 2018/044537 A1 | 3/2018 | |
| WO | 2018087408 A1 | 5/2018 | |
| WO | 2018097831 A1 | 5/2018 | |
| WO | 2018166921 A1 | 9/2018 | |
| WO | 2019148154 A1 | 8/2019 | |
| WO | 2020010226 A1 | 1/2020 | |

OTHER PUBLICATIONS

Gold et al., "Apparatus and method for automatic cpu speed control", 2000 (Year: 2000).*

Jusufovic et al., "State Machine for low noise clocking of high frequency clocks", 2016 (Year: 2016).*

(56) References Cited

OTHER PUBLICATIONS

Levitt et al., "Processor core communications in multi-core processors", 2013 (Year: 2013).*
Midkiff et al., "Power profiling", 2006 (Year: 2006).*
Mrad et al., "A framework for System Level Low Power Design Space Exploration", 2017 (Year: 2017).*
Stant et al., "Power conservation in microprocessor controlled devices", 1991 (Year: 1991).*
TechTarget, "multi-processor", 2013 (Year: 2013).*
Weissel et al., "Process Cruise Control", 2002 (Year: 2002).*
International Search Report and Written Opinion dated Jun. 15, 2020, International PCT Patent Application No. PCT/US2020/017023, (13 pages).
Weissel, et al., "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/10.1145/581630.581668>, p. 238-246.
Invitation to Pay Additional Fees dated Apr. 3, 2020, International Patent Application No. PCT/US20/17023, (2 pages).
"ARToolKit: Hardware", https://web.archive.org/web/20051013062315/http://www.hitl.washington.edu:80/artoolkit/documentation/hardware.htm (downloaded Oct. 26, 2020), Oct. 13, 2015, (3 pages).
Communication Pursuant to Rule 164(1) EPC dated Jul. 27, 2021, European Patent Application No. 19833664.6 , (11 pages).
European Search Report dated Oct. 15, 2020, European Patent Application No. 20180623.9 , (10 pages).
Extended European Search Report dated Jan. 22, 2021, European Patent Application No. 18890390.0 , (11 pages).
Extended European Search Report dated Nov. 3, 2020, European Patent Application No. 18885707.2 , (7 pages).
Extended European Search Report dated Jun. 30, 2021, European Patent Application No. 19811971.1 , (9 pages).
Extended European Search Report dated Mar. 4, 2021, European Patent Application No. 19768418.6 , (9 pages).
Extended European Search Report dated Nov. 4, 2020, European Patent Application No. 20190980.1 , (14 pages).
Extended European Search Report dated Jul. 16, 2021, European Patent Application No. 19810142.0 , (14 pages).
Extended European Search Report dated Jul. 30, 2021, European Patent Application No. 19839970.1 , (7 pages).
Final Office Action dated Jun. 15, 2021, U.S. Appl. No. 16/928,313 , (42 pages).
Final Office Action dated Mar. 1, 2021, U.S. Appl. No. 16/214,575 , (29 pages).
Final Office Action dated Mar. 19, 2021, U.S. Appl. No. 16/530,776 , (25 pages).
Final Office Action dated Nov. 24, 2020, U.S. Appl. No. 16/435,933 , (44 pages).
International Search Report and Written Opinion dated Feb. 12, 2021, International Application No. PCT/US20/60555 , (25 pages).
International Search Report and Written Opinion dated Feb. 2, 2021, International PCT Patent Application No. PCT/US20/60550 , (9 pages).
International Search Report and Written Opinion dated Dec. 3, 2020, International Patent Application No. PCT/US20/43596 , (25 pages).
Non Final Office Action dated Jan. 26, 2021, U.S. Appl. No. 16/928,313 , (33 pages).
Non Final Office Action dated Jan. 27, 2021, U.S. Appl. No. 16/225,961 , (15 pages).
Non Final Office Action dated Jul. 9, 2021, U.S. Appl. No. 17/002,663 , (43 pages).
Non Final Office Action dated Jul. 9, 2021, U.S. Appl. No. 16/833,093 , (47 pages).
Non Final Office Action dated Jun. 10, 2021, U.S. Appl. No. 16/938,782 , (40 Pages).
Non Final Office Action dated Jun. 29, 2021, U.S. Appl. No. 16/698,588 , (58 pages).
Non Final Office Action dated Mar. 3, 2021, U.S. Appl. No. 16/427,337 , (41 pages).
Non Final Office Action dated May 26, 2021, U.S. Appl. No. 16/214,575 , (19 pages).
Non Final Office Action dated Nov. 5, 2020, U.S. Appl. No. 16/530,776 , (45 pages).
"Phototourism Challenge", CVPR 2019 Image Matching Workshop. https://image matching-workshop. github.io. , (16 pages).
Altwaijry , et al. , "Learning to Detect and Match Keypoints with Deep Architectures", Proceedings of the British Machine Vision Conference (BMVC), BMVA Press, Sep. 2016, [retrieved on Jan. 8, 2021 (Jan. 8, 2021 )] < URL: http://www.bmva.org/bmvc/2016/papers/paper049/index.html >, en lire document, especially Abstract.
Arandjelović, Relja , et al. , "Three things everyone should know to improve object retrieval", CVPR, 2012 , (8 pages).
Azuma, Ronald T. , "A Survey of Augmented Reality", Presence: Teleoperators and Virtual Environments 6, 4 (Aug. 1997), 355-385; https://web.archive.org/web/20010604100006/http://www.cs.unc.edu/~azuma/ARpresence.pdf (downloaded Oct. 26, 2020).
Azuma, Ronald T. , "Predictive Tracking for Augmented Reality", Department of Computer Science, Chapel Hill NC; TR95-007, Feb. 1995 , 262 pages.
Battaglia, Peter W, et al. , "Relational inductive biases, deep learning, and graph networks" , arXiv:1806.01261, Oct. 17, 2018 , pp. 1-40.
Berg, Alexander C , et al. , "Shape matching and object recognition using low distortion correspondences", In CVPR, 2005 , (8 pages).
Bian, Jiawang , et al. , "GMS: Grid-based motion statistics for fast, ultra-robust feature correspondence.", In CVPR (Conference on Computer Vision and Pattern Recognition), 2017 , (10 pages).
Bimber, Oliver , et al. , "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007) , (393 pages).
Brachmann, Eric , et al. , "Neural-Guided RANSAC: Learning Where to Sample Model Hypotheses", In ICCV (International Conference on Computer Vision ), arXiv:1905.04132v2 [cs.CV] Jul. 31, 2019 , (17 pages).
Butail , et al. , "Putting the fish in the fish tank: Immersive VR for animal behavior experiments", In: 2012 IEEE International Conference on Robotics and Automation. May 18, 2012 (May 18, 2012) Retrieved on Nov. 14, 2020 (Nov. 14, 2020) from <http://lcdcl.umd.edu/papers/icra2012.pdf> entire document.
Caetano, Tibério S , et al. , "Learning graph matching" , IEEE TPAMI, 31(6):1048-1058, 2009.
Cech, Jan , et al. , "Efficient sequential correspondence selection by cosegmentation", IEEE TPAMI, 32(9):1568-1581, Sep. 2010.
Cuturi, Marco , "Sinkhorn distances: Lightspeed computation of optimal transport", NIPS, 2013 , (9 pages).
Dai, Angela , et al. , "ScanNet: Richly-annotated 3d reconstructions of indoor scenes", In CVPR, arXiv:1702.04405v2 [cs.CV] Apr. 11, 2017 , (22 pages).
Deng, Haowen , et al. , "PPFnet: Global context aware local features for robust 3d point matching" , In CVPR, arXiv:1802.02669v2 [cs.CV] Mar. 1, 2018 , (12 pages).
Detone, Daniel , et al. , "Deep image homography estimation", In RSS Work-shop: Limits and Potentials of Deep Learning in Robotics, arXiv:1606.03798v1 [cs.CV] Jun. 13, 2016 , (6 pages).
Detone, Daniel , et al. , "Self-improving visual odometry" , arXiv:1812.03245, Dec. 8, 2018 , (9 pages).
Detone, Daniel , et al. , "SuperPoint: Self-supervised interest point detection and description", In CVPR Workshop on Deep Learning for Visual SLAM, arXiv:1712.07629v4 [cs.CV] Apr. 19, 2018 , (13 pages).
Dusmanu, Mihai , et al. , "D2-net: A trainable CNN for joint detection and description of local features" , CVPR, arXiv:1905.03561v1 [cs.CV] May 9, 2019 , (16 pages).
Ebel, Patrick , et al. , "Beyond cartesian representations for local descriptors", ICCV, arXiv:1908.05547v1 [cs.CV] Aug. 15, 2019 , (11 pages).

(56) References Cited

OTHER PUBLICATIONS

Fischler, Martin A., et al., "Random sample consensus: a paradigm for model fitting with applications to image analysis and automated cartography", Communications of the ACM, 24(6): 1981, pp. 381-395.
Gilmer, Justin, et al., "Neural message passing for quantum chemistry", In ICML, arXiv:1704.01212v2 [cs.LG] Jun. 12, 2017, (14 pages).
Giuseppe, Donato, et al., "Stereoscopic helmet mounted system for real time 3D environment reconstruction and indoor ego—motion estimation", Proc. SPIE 6955, Head- and Helmet-Mounted Displays XIII: Design and Applications, 69550P.
Hartley, Richard, et al., "Multiple View Geometry in Computer Vision", Cambridge University Press, 2003, pp. 1-673.
Jacob, Robert J.K., "Eye Tracking in Advanced Interface Design", Human-Computer Interaction Lab, Naval Research Laboratory, Washington, D.C., date unknown. 2003, pp. 1-50.
Lee, et al., "Self-Attention Graph Pooling", Cornell University Library/Computer Science/Machine Learning, Apr. 17, 2019 [retrieved on Jan. 8, 2021 from the Internet< URL: https://arxiv.org/abs/1904.08082 >, entire document.
Lee, Juho, et al., "Set transformer: A frame-work for attention-based permutation-invariant neural networks", ICML, arXiv:1810.00825v3 [cs.LG] May 26, 2019, (17 pages).
Leordeanu, Marius, et al., "A spectral technique for correspondence problems using pairwise constraints", Proceedings of (ICCV) International Conference on Computer Vision, vol. 2, pp. 1482-1489, Oct. 2005, (8 pages).
Li, Yujia, et al., "Graph matching networks for learning the similarity of graph structured objects", ICML, arXiv:1904.12787v2 [cs.LG] May 12, 2019, (18 pages).
Li, Zhengqi, et al., "Megadepth: Learning single-view depth prediction from internet photos", In CVPR, fromarXiv: 1804.00607v4 [cs.CV] Nov. 28, 2018, (10 pages).
Libovicky, et al., "Input Combination Strategies for Multi-Source Transformer Decoder", Proceedings of the Third Conference on Machine Translation (WMT). vol. 1: Research Papers, Belgium, Brussels, Oct. 31-Nov. 1, 2018; retrieved on Jan. 8, 2021 (Jan. 8, 2021) from < URL: https://doi.org/10.18653/v1/W18-64026 >, entire document.
Loiola, Eliane Maria, et al., "A survey for the quadratic assignment problem", European journal of operational research, 176(2): 2007, pp. 657-690.
Lowe, David G., "Distinctive image features from scale-invariant keypoints", International Journal of Computer Vision, 60(2): 91-110, 2004, (28 pages).
Luo, Zixin, et al., "ContextDesc: Local descriptor augmentation with cross-modality context", CVPR, arXiv:1904.04084v1 [cs.CV] Apr. 8, 2019, (14 pages).
Molchanov, Pavlo, et al., "Short-range FMCW monopulse radar for hand-gesture sensing", 2015 IEEE Radar Conference (RadarCon) (2015), pp. 1491-1496.
Munkres, James, "Algorithms for the assignment and transportation problems", Journal of the Society for Industrial and Applied Mathematics, 5(1): 1957, pp. 32-38.
Ono, Yuki, et al., "LF-Net: Learning local features from images", 32nd Conference on Neural Information Processing Systems (NIPS 2018), arXiv:1805.09662v2 [cs.CV] Nov. 22, 2018, (13 pages).
Paszke, Adam, et al., "Automatic differentiation in Pytorch", 31st Conference on Neural Information Processing Systems (NIPS 2017), Long Beach, CA, USA, (4 pages).
Peyré, Gabriel, et al., "Computational Optimal Transport", Foundations and Trends in Machine Learning, 11(5-6):355-607, 2019; arXiv:1803.00567v4 [stat.ML] Mar. 18, 2020, (209 pages).
Qi, Charles Ruizhongtai, et al., "Pointnet++: Deep hierarchical feature learning on point sets in a metric space.", 31st Conference on Neural Information Processing Systems (NIPS 2017), Long Beach, CA, USA., (10 pages).
Qi, Charles R., et al., "Pointnet: Deep Learning on Point Sets for 3D Classification and Segmentation", CVPR, arXiv:1612.00593v2 [cs.CV] Apr. 10, 201, (19 pages).
Radenović, Filip, et al., "Revisiting Oxford and Paris: Large-Scale Image Retrieval Benchmarking", CVPR, arXiv:1803.11285v1 [cs.CV] Mar. 29, 2018, (10 pages).
Raguram, Rahul, et al., "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I, (15 pages).
Ranftl, René, et al., "Deep fundamental matrix estimation", European Conference on Computer Vision (ECCV), 2018, (17 pages).
Revaud, Jerome, et al., "R2D2: Repeatable and Reliable Detector and Descriptor", In NeurIPS, arXiv:1906.06195v2 [cs.CV] Jun. 17, 2019, (12 pages).
Rocco, Ignacio, et al., "Neighbourhood Consensus Networks", 32nd Conference on Neural Information Processing Systems (NeurIPS 2018), Montréal, Canada, arXiv:1810.10510v2 [cs.CV] Nov. 29, 2018, (20 pages).
Rublee, Ethan, et al., "ORB: An efficient alternative to SIFT or SURF", Proceedings of the IEEE International Conference on Computer Vision. 2564-2571. 2011; 10.1109/ICCV.2011.612654, (9 pages).
Sarlin, et al., "SuperGlue: Learning Feature Matching with Graph Neural Networks", Cornell University Library/Computer Science/Computer Vision and Pattern Recognition, Nov. 26, 2019 [retrieved on Jan. 8, 2021 from the Internet< URL: https://arxiv.org/abs/1911.11763 >, entire document.
Sattler, Torsten, et al., "SCRAMSAC: Improving RANSAC's efficiency with a spatial consistency filter", ICCV, 2009: 2090-2097., (8 pages).
Schonberger, Johannes Lutz, et al., "Pixelwise view selection for un-structured multi-view stereo, Computer Vision—ECCV 2016: 14th European Conference, Amsterdam, The Netherlands, Oct. 11-14, 2016, Proceedings, Part III", pp. 501-518, 2016.
Schonberger, Johannes Lutz, et al., "Structure-from-motion revisited", Proceedings of the IEEE Conference on Computer Vision and Pattern Recognition (CVPR), 2016, pp. 4104-4113, (11 pages).
Sheng, Liu, et al., "Time-multiplexed dual-focal plane head-mounted display with a liquid lens", Optics Letters, Optical Society of Amer I Ca, US, vol. 34, No. 11, Jun. 1, 2009 (Jun. 1, 2009), XP001524475, ISSN: 0146-9592, pp. 1642-1644.
Sinkhorn, Richard, et al., "Concerning nonnegative matrices and doubly stochastic matrices.", Pacific Journal of Mathematics, 1967, pp. 343-348.
Tanriverdi, Vildan, et al., "Interacting With Eye Movements in Virtual Environments", Department of Electrical Engineering and Computer Science, Tufts University; Proceedings of the SIGCHI conference on Human Factors in Computing Systems, Apr. 2000, pp. 1-8.
Thomee, Bart, et al., "YFCC100m: The new data in multimedia research", Communications of the ACM, 59(2):64-73, 2016; arXiv:1503.01817v2 [cs.MM] Apr. 25, 2016, (8 pages).
Torresani, Lorenzo, et al., "Feature correspondence via graph matching: Models and global optimization", Computer Vision—ECCV 2008, 10th European Conference on Computer Vision, Marseille, France, Oct. 12-18, 2008, Proceedings, Part II, (15 pages).
Tuytelaars, Tinne, et al., "Wide baseline stereo matching based on local, affinely invariant regions", BMVC, 2000, pp. 1-14.
Ulyanov, Dmitry, et al., "Instance normalization: The missing ingredient for fast stylization", arXiv:1607.08022v3 [cs.CV] Nov. 6, 2017, (6 pages).
Vaswani, Ashish, et al., "Attention is all you need", 31st Conference on Neural Information Processing Systems (NIPS 2017), Long Beach, CA, USA; arXiv:1706.03762v5 [cs.CL] Dec. 6, 2017, (15 pages).
Veličković, Petar, et al., "Graph attention networks", ICLR, arXiv:1710.10903v3 [stat.ML] Feb. 4, 2018, (12 pages).
Villani, Cédric, "Optimal transport: old and new", vol. 338. Springer Science & Business Media, Jun. 2008, pp. 1-998.

(56) References Cited

OTHER PUBLICATIONS

Wang, Xiaolong, et al., "Non-local neural networks", CVPR, arXiv:1711.07971v3 [cs.CV] Apr. 13, 2018, (10 pages).
Wang, Yue, et al., "Deep Closest Point: Learning representations for point cloud registration", ICCV, arXiv:1905.03304v1 [cs.CV] May 8, 2019, (10 pages).
Wang, Yue, et al., "Dynamic Graph CNN for learning on point clouds", ACM Transactions on Graphics, arXiv:1801.07829v2 [cs.CV] Jun. 11, 2019, (13 pages).
Yi, Kwang Moo, et al., "Learning to find good correspondences", CVPR, arXiv:1711.05971v2 [cs.CV] May 21, 2018, (13 pages).
Yi, Kwang Moo, et al., "Lift: Learned invariant feature transform", ECCV, arXiv:1603.09114v2 [cs.CV] Jul. 29, 2016, (16 pages).
Zaheer, Manzil, et al., "Deep Sets", 31st Conference on Neural Information Processing Systems (NIPS 2017), Long Beach, CA, USA; arXiv:1703.06114v3 [cs.LG] Apr. 14, 2018, (29 pages).
Zhang, Jiahui, et al., "Learning two-view correspondences and geometry using order-aware network", ICCV; aarXiv:1908.04964v1 [cs.CV] Aug. 14, 2019, (11 pages).
Zhang, Li, et al., "Dual graph convolutional net-work for semantic segmentation", BMVC, 2019; arXiv:1909.06121v3 [cs.CV] Aug. 26, 2020, (18 pages).
Communication Pursuant to Article 94(3) EPC dated Sep. 4, 2019, European Patent Application No. 10793707.0, (4 pages).
Examination Report dated Jun. 19, 2020, European Patent Application No. 20154750.2, (10 pages).
Extended European Search Report dated May 20, 2020, European Patent Application No. 20154070.5, (7 pages).
Extended European Search Report dated Jun. 12, 2017, European Patent Application No. 16207441.3, (8 pages).
Final Office Action dated Aug. 10, 2020, U.S. Appl. No. 16/225,961, (13 pages).
Final Office Action dated Dec. 4, 2019, U.S. Appl. No. 15/564,517, (15 pages).
Final Office Action dated Feb. 19, 2020, U.S. Appl. No. 15/552,897, (17 pages).
International Search Report and Written Opinion dated Mar. 12, 2020, International PCT Patent Application No. PCT/US19/67919, (14 pages).
International Search Report and Written Opinion dated Aug. 15, 2019, International PCT Patent Application No. PCT/US19/33987, (20 pages).
International Search Report and Written Opinion dated Oct. 16, 2019, International PCT Patent Application No. PCT/US19/43097, (10 pages).
International Search Report and Written Opinion dated Oct. 16, 2019, International PCT Patent Application No. PCT/US19/36275, (10 pages).
International Search Report and Written Opinion dated Oct. 16, 2019, International PCT Patent Application No. PCT/US19/43099, (9 pages).
International Search Report and Written Opinion dated Jun. 17, 2016, International PCT Patent Application No. PCT/FI2016/050172, (9 pages).
International Search Report and Written Opinion dated Oct. 22, 2019, International PCT Patent Application No. PCT/US19/43751, (9 pages).
International Search Report and Written Opinion dated Dec. 23, 2019, International PCT Patent Application No. PCT/US19/44953, (11 pages).
International Search Report and Written Opinion dated May 23, 2019, International PCT Patent Application No. PCT/US18/66514, (17 pages).
International Search Report and Written Opinion dated Sep. 26, 2019, International PCT Patent Application No. PCT/US19/40544, (12 pages).
International Search Report and Written Opinion dated Aug. 27, 2019, International PCT Application No. PCT/US2019/035245, (8 pages).
International Search Report and Written Opinion dated Dec. 27, 2019, International Application No. PCT/US19/47746, (16 pages).
International Search Report and Written Opinion dated Sep. 30, 2019, International Patent Application No. PCT/US19/40324, (7 pages).
International Search Report and Written Opinion dated Sep. 4, 2020, International Patent Application No. PCT/US20/31036, (13 pages).
International Search Report and Written Opinion dated Jun. 5, 2020, International Patent Application No. PCT/US20/19871, (9 pages).
International Search Report and Written Opinion dated Aug. 8, 2019, International PCT Patent Application No. PCT/US2019/034763, (8 pages).
International Search Report and Written Opinion dated Oct. 8, 2019, International PCT Patent Application No. PCT/US19/41151, (7 pages).
International Search Report and Written Opinion dated Jan. 9, 2020, International Application No. PCT/US19/55185, (10 pages).
International Search Report and Written Opinion dated Feb. 28, 2019, International Patent Application No. PCT/US18/64686, (8 pages).
International Search Report and Written Opinion dated Feb. 7, 2020, International PCT Patent Application No. PCT/US2019/061265, (11 pages).
International Search Report and Written Opinion dated Jun. 11, 2019, International PCT Application No. PCT/US19/22620, (7 pages).
Invitation to Pay Additional Fees dated Aug. 15, 2019, International PCT Patent Application No. PCT/US19/36275, (2 pages).
Invitation to Pay Additional Fees dated Sep. 24, 2020, International Patent Application No. PCT/US2020/043596, (3 pages).
Invitation to Pay Additional Fees dated Oct. 22, 2019, International PCT Patent Application No. PCT/US19/47746, (2 pages).
Invitation to Pay Additional Fees dated Oct. 17, 2019, International PCT Patent Application No. PCT/US19/44953, (2 pages).
Non Final Office Action dated Aug. 21, 2019, U.S. Appl. No. 15/564,517, (14 pages).
Non Final Office Action dated Jul. 27, 2020, U.S. Appl. No. 16/435,933, (16 pages).
Non Final Office Action dated Jun. 17, 2020, U.S. Appl. No. 16/682,911, (22 pages).
Non Final Office Action dated Jun. 19, 2020, U.S. Appl. No. 16/225,961, (35 pages).
Non Final Office Action dated Nov. 19, 2019, U.S. Appl. No. 16/355,611, (31 pages).
Non Final Office Action dated Oct. 22, 2019, U.S. Appl. No. 15/859,277, (15 pages).
Non Final Office Action dated Sep. 1, 2020, U.S. Appl. No. 16/214,575, (40 pages).
Notice of Allowance dated Mar. 25, 2020, U.S. Appl. No. 15/564,517, (11 pages).
Notice of Allowance dated Oct. 5, 2020, U.S. Appl. No. 16/682,911, (27 pages).
Notice of Reason of Refusal dated Sep. 11, 2020 with English translation, Japanese Patent Application No. 2019-140435, (6 pages).
Summons to attend oral proceedings pursuant to Rule 115(1) EPC dated Jul. 15, 2019, European Patent Application No. 15162521.7, (7 pages).
Aarik, J. et al., "Effect of crystal structure on optical properties of TiO2 films grown by atomic layer deposition", Thin Solid Films; Publication [online]. May 19, 1998 [retrieved Feb. 19, 2020]. Retrieved from the Internet: <URL: https://www.sciencedirect.com/science/article/pii/S0040609097001351?via%3Dihub>; DOI: 10.1016/S0040-6090(97)00135-1; see entire document, (2 pages).
Azom, , "Silica—Silicon Dioxide (SiO2)", AZO Materials; Publication [Online]. Dec. 13, 2001 [retrieved Feb. 19, 2020]. Retrieved from the Internet: <URL: https://www.azom.com/article.aspx?ArticleID=1114>, (6 pages).
Goodfellow, , "Titanium Dioxide—Titania (TiO2)", AZO Materials; Publication [online]. Jan. 11, 2002 [retrieved Feb. 19, 2020]. Retrieved from the Internet: <URL: https://www.azom.com/article.aspx?ArticleID=1179>, (9 pages).

(56) References Cited

OTHER PUBLICATIONS

Levola, T., "Diffractive Optics for Virtual Reality Displays", Journal of the SID Eurodisplay 14/05, 2005, XP008093627, chapters 2-3, Figures 2 and 10, pp. 467-475.
Levola, Tapani, "Invited Paper: Novel Diffractive Optical Components for Near to Eye Displays—Nokia Research Center", SID 2006 Digest, 2006 SID International Symposium, Society for Information Display, vol. XXXVII, May 24, 2005, chapters 1-3, figures 1 and 3, pp. 64-67.
Memon, F. et al., "Synthesis, Characterization and Optical Constants of Silicon Oxycarbide", EPJ Web of Conferences; Publication [online]. Mar. 23, 2017 [retrieved Feb. 19, 2020).<URL: https://www.epj-conferences.org/articles/epjconf/pdf/2017/08/epjconf_nanop2017_00002.pdf>; DOI: 10.1051/epjconf/201713900002, (8 pages).
Spencer, T. et al., "Decomposition of poly(propylene carbonate) with UV sensitive iodonium 11 salts", Polymer Degradation and Stability; (online]. Dec. 24, 2010 (retrieved Feb. 19, 2020]., <URL: http:/fkohl.chbe.gatech.edu/sites/default/files/linked_files/publications/2011Decomposition%20of%20poly(propylene%20carbonate)%20with%20UV%20sensitive%20iodonium%20salts,pdf>; DOI: 10,1016/j.polymdegradstab.2010, 12.003, (17 pages).
Jacob, Robert J., "Eye Tracking in Advanced Interface Design", Human-Computer Interaction Lab, Naval Research Laboratory, Washington, D.C., date unknown. 2003, pp. 1-50.
Communication Pursuant to Article 94(3) EPC dated Jan. 4, 2022, European Patent Application No. 20154070.5, (8 pages).
Extended European Search Report dated Jan. 28, 2022, European Patent Application No. 19815876.8, (9 pages).
Extended European Search Report dated Jan. 4, 2022, European Patent Application No. 19815085.6, (9 pages).
Final Office Action dated Feb. 23, 2022, U.S. Appl. No. 16/748,193, (23 pages).
Final Office Action dated Feb. 3, 2022, U.S. Appl. No. 16/864,721, (36 pages).
Non Final Office Action dated Apr. 1, 2022, U.S. Appl. No. 17/256,961, (65 pages).
Non Final Office Action dated Mar. 31, 2022, U.S. Appl. No. 17/257,814, (60 pages).
Communication Pursuant to Article 94(3) EPC dated Oct. 21, 2021, European Patent Application No. 16207441.3, (4 pages).
Extended European Search Report dated Oct. 27, 2021, European Patent Application No. 19833664.6, (10 pages).
Extended European Search Report dated Sep. 20, 2021, European Patent Application No. 19851373.1, (8 pages).
Extended European Search Report dated Sep. 28, 2021, European Patent Application No. 19845418.3, (13 pages).
Final Office Action dated Sep. 17, 2021, U.S. Appl. No. 16/938,782, (44 pages).
Non Final Office Action dated Aug. 4, 2021, U.S. Appl. No. 16/864,721, (51 pages).
Non Final Office Action dated Sep. 20, 2021, U.S. Appl. No. 17/105,848, (56 pages).
Non Final Office Action dated Sep. 29, 2021, U.S. Appl. No. 16/748,193, (62 pages).
Communication according to Rule 164(1) EPC dated Feb. 23, 2022, European Patent Application No. 20753144.3, (11 pages).
Extended European Search Report dated Mar. 22, 2022, European Patent Application No. 19843487.0, (14 pages).
First Office Action dated Feb. 11, 2022 with English translation, Chinese Patent Application No. 201880089255.6, (17 pages).
First Office Action dated Mar. 14, 2022 with English translation, Chinese Patent Application No. 201880079474.6, (11 pages).
Non Final Office Action dated Apr. 11, 2022, U.S. Appl. No. 16/938,782, (52 pages).
Non Final Office Action dated Apr. 12, 2022, U.S. Appl. No. 17/262,991, (60 pages).
Non Final Office Action dated Mar. 9, 2022, U.S. Appl. No. 16/870,676, (57 pages).
"Extended European Search Report dated May 16, 2022", European Patent Application No. 19871001.4, (9 pages).
"Extended European Search Report dated May 30, 2022", European Patent Application No. 20753144.3, (10 pages).

\* cited by examiner

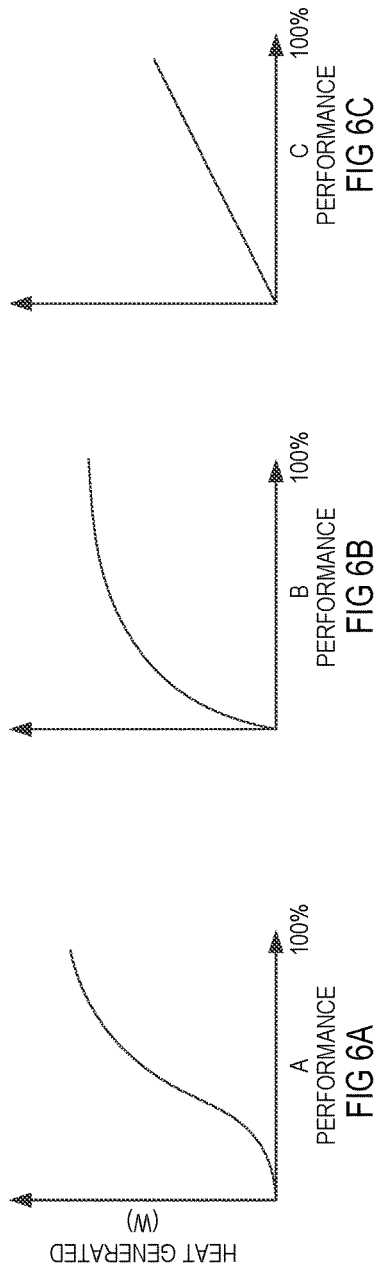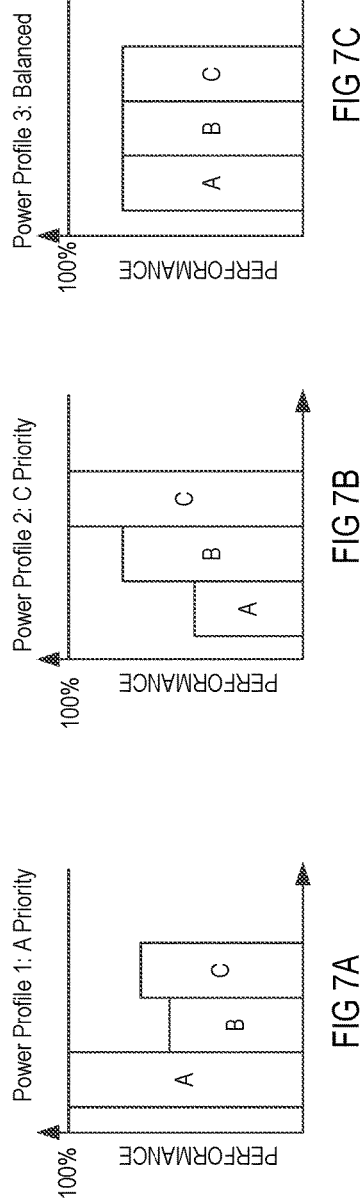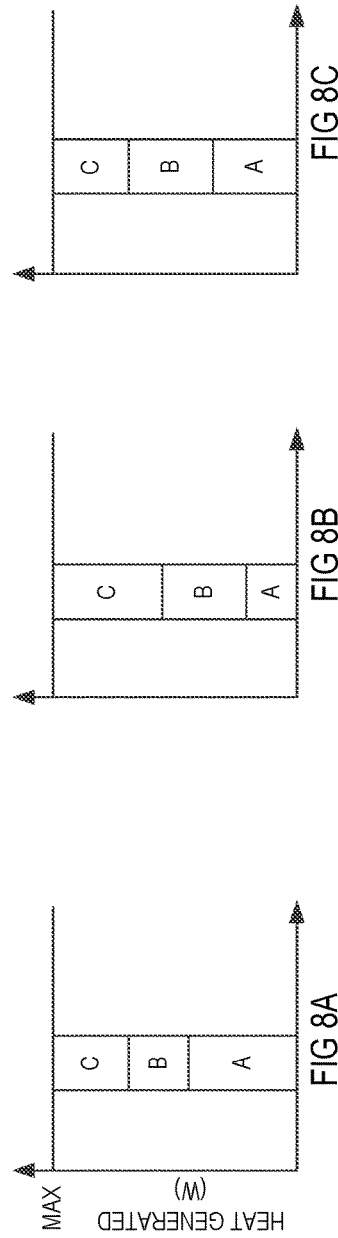

TARGET INTENT-BASED CLOCK SPEED DETERMINATION AND ADJUSTMENT TO LIMIT TOTAL HEAT GENERATED BY MULTIPLE PROCESSORS

CROSS-REFERENCE TO RELATED APPLICATIONS

This application claims priority from U.S. Provisional Patent Application No. 62/802,140, filed on Feb. 6, 2019, all of which is incorporated herein by reference in its entirety.

BACKGROUND OF THE INVENTION

1). Field of the Invention

This invention relates to structured application development system.

2). Discussion of Related Art

Consumer devices such as personal computers, smart phones, stereoscopic viewers, mixed reality viewers, etc. have a storage medium for storing an application and one or more processors that execute routines of the application. Such applications include operating systems and other applications such as games, browsers, etc. that perform a multitude of tasks.

Multi-core processor chips include more than one processor core. These processor cores may, for example, include a central processing unit (CPU), a graphic processing unit (GPU), vector processing, etc. When an application developer develops an application for running on multiple processors, the developer programs clock speeds for the various processors.

Each processor generates an amount of heat per unit time that increases as its clock speed goes up. A multi-processor chip can normally dispense of all the heat of one processor running at 100% of its maximum clock speed. However, when all the processors run at 100% of their maximum clock speed, a multi-core processor chip may not be able to dispense of all the heat that is generated by all the processors, which may cause damage to the circuitry of the processors of the multi-core processor chip. Specifications may exist for clock speeds of a multi-core processor chip that detail how the clock speeds should be limited to limit the maximum amount of heat that is generated by all of the processors per unit time. The danger exists that a developer may ignore the specifications, which will result in damage to the multi-core processor chip.

SUMMARY OF THE INVENTION

According to one aspect of the invention, a host computer system is provided that includes a host computer processor, a computer-readable medium connected to the host computer processor, and a set of instructions on the computer-readable medium, the set of instructions being readable by the host computer processor and including a structured application development system having a power profile data library on the computer-readable medium that includes a first reference intent a first power profile associated with the first reference intent and having a respective first maximum clock speed for a first processor and a respective second maximum clock speed for a second processor, a second reference intent, and a second power profile associated with the second reference intent and having a respective first maximum clock speed for the first processor and a respective second maximum clock speed for the second processor, the first maximum clock speed of the first power profile being different from the first maximum clock speed for the second power profile.

The invention also provides a method of operating a host computer system including storing a power profile data library on a computer-readable medium, the power profile data library including a first reference intent, a first power profile associated with the first reference intent and having a respective first maximum clock speed for a first processor and a respective second maximum clock speed for a second processor, a second reference intent, and a second power profile associated with the second reference intent and having a respective first maximum clock speed for the first processor and a respective second maximum clock speed for the second processor, the first maximum clock speed of the first power profile being different from the first maximum clock speed for the second power profile.

The invention further provides a consumer device that includes a multi-core processor chip having a body and a plurality of processors on the body, a computer-readable medium connected to the processors, and an application on the computer-readable medium, the application having a first section, the first section having, a first routine that is executable by the processors, and a first power profile having a respective maximum clock speed for each one of the processors, and a second section, the second section having a second routine that is executable by the processors, and a second power profile having a respective maximum clock speed for each one of the processors so that at least one of the processors has a maximum clock speed that changes from the first section to the second section, wherein the processors jointly generate a first amount of heat per unit time during the first section and a second amount of heat during the second section and the second amount of heat is less than 10% different than the first amount of heat.

The invention further provides a method of operating a consumer device that includes storing an application on the computer-readable medium connected to a plurality of processors on a body of a multi-core processor chip, the application having first and second sections, executing the first section with the processors, the first section having, a first routine that is executable by the processors, and a first power profile having a respective maximum clock speed for each one of the processors, and executing the second section with the processors, the second section having, a second routine that is executable by the processors, and a second power profile having a respective maximum clock speed for each one of the processors so that at least one of the processors has a maximum clock speed that changes from the first section to the second section, wherein the processors jointly generate a first amount of heat per unit time during the first section and a second amount of heat during the second section and the second amount of heat is less than 10% different than the first amount of heat.

The invention further provides a consumer device that includes first and second processors a computer-readable medium connected to the processors, and an application on the computer-readable medium, the application having a first section, the first section having a first routine that is executable by the first and second processors, and a first power profile, the first power profile having first and second maximum clock speeds for the first and second processors, and a second section, the second section having, a second routine that is executable by the first and second processors, and a second power profile, the second power profile having first and second maximum clock speeds for the first and second processors, the first maximum clock speed of the first power profile being different from the first maximum clock speed for the second power profile and the second maximum clock speed of the first power profile be different from the second maximum clock speed for the second power profile.

BRIEF DESCRIPTION OF THE DRAWINGS

The invention is further described by way of example with reference to the accompanying drawings, wherein:

FIGS. 6A, 6B and 6C are graphs showing power curves of three different processors;

FIGS. 7A, 7B and 7C are graphs showing three different power profiles;

FIGS. 8A, 8B and 8C are graphs illustrating heat generated by the power profiles in FIGS. 7A, 7B and 7C respectively.

DETAILED DESCRIPTION OF THE INVENTION

Figure 1:
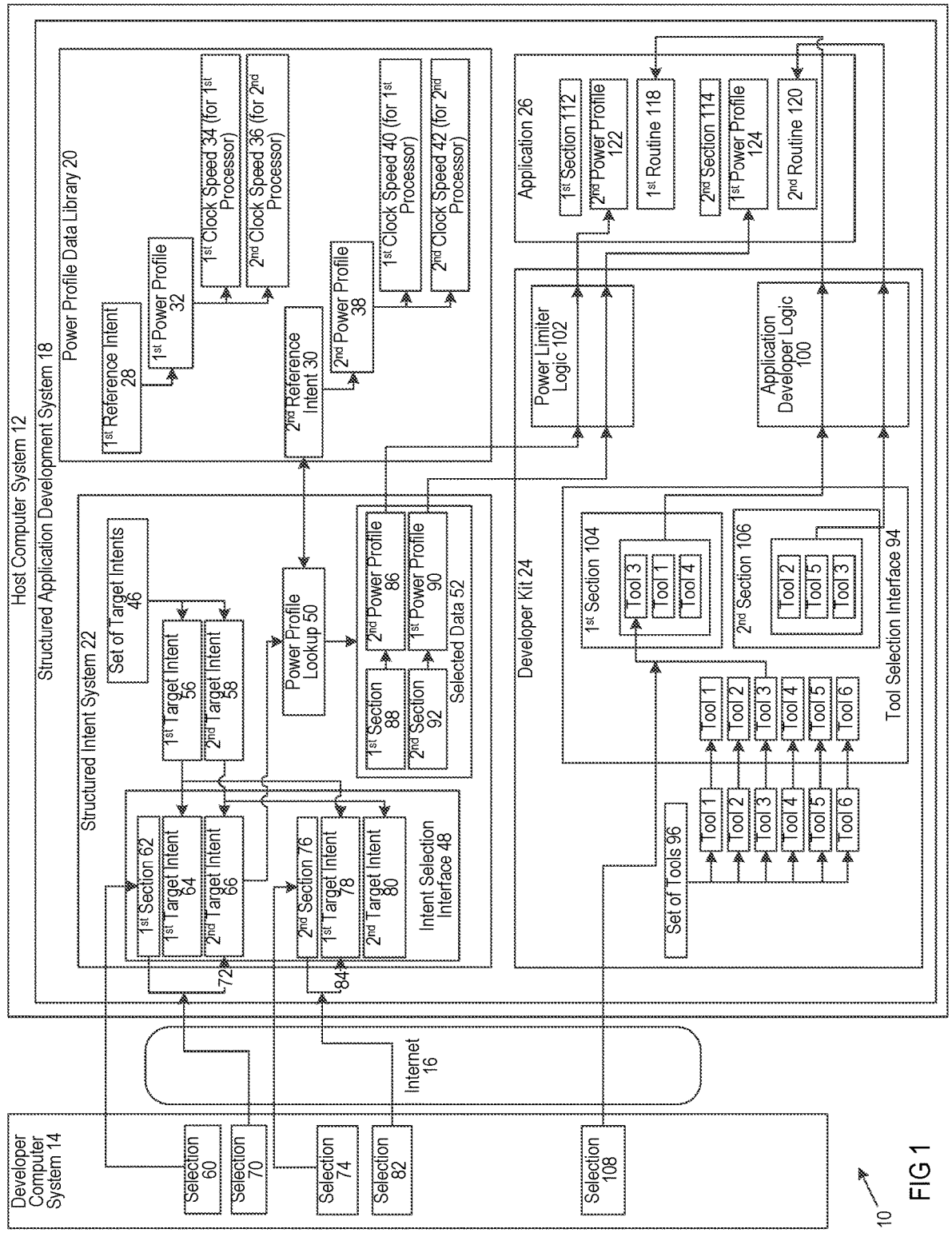
FIG. 1 is a block diagram showing a network environment, according to an embodiment of the invention having a host computer system and a developer computer system that are connected to one another over a network in the form of the Internet.

FIG. 1 of the accompanying drawings illustrates a network environment 10 that includes a host computer system 12 and a developer computer system 14 that are connected to one another over a network in the form of the Internet 16, according to an embodiment of the invention. A majority of data and logic resides on the host computer system 12 and the developer computer system 14 is given access to certain components on the host computer system 12 over the Internet 16 with only a browser application residing on the developer computer system 14. In another embodiment, all of the data and functionality may reside on the developer computer system 14, thus eliminating the need for the host computer system 12—the developer computer system 14 effectively becomes the host computer system. It is, however, preferred that certain controls reside on the host computer system 12 and outside the reach of a developer at the developer computer system 14. A further embodiment may include certain data and functionality on the host computer system 12, in particular such data and functionality that should be under the control of the host computer system 12, while a remainder of the data and functionality may reside on the developer computer system 14.

The host computer system 12 includes a structured application development system 18. The structured application development system 18 initially resides on a storage medium of the host computer system 12. Components of the structured application development system 18 are loaded into memory of the host computer system 12 as they are needed. Components of the structured application development system 18 include selected 80 data 52 that remain on the memory and various components of logic that are executable by a host computer processor of the host computer system 12 connected to the memory.

The structured application development system 18 includes a power profile data library 20, a structured intent system 22, a developer kit 24, and an application 26 that is being developed. The application 26 may not initially form part of the structured application development system 18. However, it is shown as part of the structured application development system 18 because it is constructed by the other components of the structured application development system 18 in conjunction with selections that are made by a developer on the developer computer system 14.

The power profile data library 20 has a first reference intent 28 and second reference intent 30. By way of example, the first reference intent 28 may be "graphics-intensive" and the second reference intent 30 may be "startup" or any other label designated to characterize demands or loads on equipment included in the system on which the program is running. The first reference intent 28 has a first power profile 32 associated therewith. The first power profile 32 has a first clock speed 34 for a first processor and a second clock speed 36 for a second processor. The first processor may, for example, be a graphic processing unit (GPU) and the second processor may be a central processing unit (CPU). If the first reference intent 28 is a graphics-intensive intent, then the first clock speed 34 for the GPU will be set high and the second clock speed 36 for the CPU will be set low. The clock speeds are selected in a manner that will limit the amount maximum of heat per unit time that the first and second processors jointly generate on a multi-core processor chip, while at the same time having each processor run at a clock speed that is optimal given the first reference intent 28.

The second reference intent 30 has a second power profile 38 associated therewith. The second power profile 38 has a first clock speed 40 for the first processor and a second clock speed 42 for the second processor. By way of example, the second reference intent 30 is a startup intent. For startup purposes the first clock speed 40 is set relatively low if the first processor is a GPU and the second clock speed 42 is set relatively high if the second processor is a CPU. The first and second clock speeds 40 and 42 are preemptively determined to keep the heat generated by the first and second processors below a maximum amount of heat per unit time if the first and second processors are on the same multi-core processor chip. What should be noted is that the first clock speed 34 of the first power profile 32 may be higher than the first clock speed 40 of the second power profile 38 and that the second clock speed 36 of the first power profile 32 may be lower than the second clock speed 42 of the second power profile 38.

The power profile data library 20 only has first and second power profiles 32 and 38. It should however be understood that the power profile data library 20 may include more power profiles, for example four power profiles, each power profile being associated with a respective reference intent.

Furthermore, the first power profile 32 and the second power profile 38 include clock speeds for only first and second processors. Each power profile may also include a clock speed for a third processor, a fourth processor, etc.

The structured intent system 22 includes a set of target intents 46, an intent selection interface 48, a power profile lookup 50 and selected data 52.

The set of target intents 46 includes a first target intent 56 and second target intent 58. The first target intent 56 may, for example, be "graphics-intensive" and the second target intent 58 may be "startup" and are therefore similar to the first and second reference intents 28 and 30 in the power profile data library 20.

The developer at the developer computer system 14 uses a browser that resides on the developer computer system 14 to access the intent selection interface 48 over the Internet 16. The intent selection interface 48 may, for example, be an interactive web page that is downloadable from the host computer system 12 over the Internet 16 on to the developer computer system 14 by the browser application and is viewable within a browser window on a display of the developer computer system 14. The intent selection interface 48 allows the developer to select sections of an application and select target intents for the respective sections.

At 60, the developer selects a first section 62 that will eventually form part of an application. The structured intent system 22 displays the first target intent 58 in the intent selection interface 48 as a first target intent 64 and the second target intent 58 as a second target intent 66. The developer is then prompted to select either the first target intent 64 or the second target intent 66 for association with the first section 62. It can be noted that the developer is not permitted to select both the first target intent 64 and the second target intent 66. The first target intent 64 and the second target intent 66 may, for example, be presented within the intent selection interface 48 in a drop down list that allows selection of only one of the first target intent 64 and the second target intent 66 and disallows selection of the other target intent. At 70, the developer makes a selection to associate the second target intent 66 (which is the same as the second target intent 58) with the first section 62. The first section 62 thus has the second target intent 66 associated therewith and the second target intent 66 is a startup-intensive target intent. The arrow 72 indicates the association of the second target intent 66 with the first section 62.

At 74, the developer makes a selection for a second section 76 of an eventual application. The structured intent system 22 displays the first target intent 56 as a first target intent 78 and the second target intent 58 as a second target intent 80 so that the developer can make a selection between the first target intent 78 and the second target intent 80. Again, the developer is only permitted to select one of the first target intent 78 and the second target intent 80 at the exclusion of the other target intent. At 82, the developer makes a selection to associate the first target intent 78 (which is the same as the first target intent 56) with the second section 76. The arrow 84 indicates the association of the first target intent 78 with the second section 76.

The power profile lookup 50 uses the second target intent 66 of the first section 62 to determine a reference intent within the power profile data library 20. In the present example, the second target intent 66 matches the second reference intent 30 because they are both startup-intensive intents. The power profile lookup 50 then extracts the second power profile 38, including the first clock speed 40 and second clock speed 42, from the power profile data library 20. The power profile lookup 50 then stores the second power profile 38 as a second power profile 86 in the selected data 52. The power profile lookup 50 stores the first section 62 as a first section 88. The power profile lookup 50 also associates the second power profile 86 with the first section 88. As will be understood by one skilled in the art of data structures, the first section 88 and the first section 62 may be the exact same piece of data. However, for purposes of illustration and ease of explanation, the first section 62 and the first section 88 are shown as separate pieces of data.

Similarly, the power profile lookup 50 uses the first target intent 78 associated with the second section 76 to find a reference intent in the power profile data library 20. In the present example, the first target intent 78 matches the first reference intent 28 because they are both graphics-intensive intents. The power profile lookup 50 extracts the first power profile 32 associated with the first reference intent 28, including the first clock speed 34 and the second clock speed 36. The power profile lookup 50 then stores the first power profile 32 as a first power profile 90 within the selected data 52. The power profile lookup 50 stores the second section 76 as a second section 92 within the selected data 52. The power profile lookup 50 also associates the first power profile 90 with the second section 92 in the selected data 52.

The developer is not permitted to select clock speeds that are not represented in the respective power profiles 86 and 90. It is thus not possible for the developer to select clock speeds that, in combination, will result in too much heat being generated per unit time on a multi-core processor chip. The developer is, however, permitted to select a target intent for a respective section for purposes of tailoring the clock speeds of the respective processors without resulting in too much heat per unit time being generated by the processors in combination.

The developer kit 24 includes a set of tools 96, a tool selection interface 94, an application developer logic 100 and a power limiter logic 102.

The set of tools 96 are a set of basic tools that a developer requires to structure the components of sections of an application that are stored on a storage device of host computer system 12. The set of tools 96 is represented as Tool 1 to Tool 6. The developer at the developer computer system 14 downloads the tool selection interface 94 from the host computer system 12 for display on the developer computer system 14, similar to the way that the intent selection interface 48 was displayed. The tool selection interface 94 includes a first section 104 and a second section 106 that correspond to the first section 88 and the second section 92 in the selected data 52. The tools of the set of tools 96 are also displayed within the tool selection interface 94. At 108, the developer selects a first tool (Tool 3) for the first section 104. The developer subsequently proceeds to select further tools for the first section 104. The tools for the first section 104 are thus configurable by the developer in terms of their selection and their sequence. The developer also selects tools for the second section 106 in a configurable manner. The first section 104 and its tools and the second section 106 and its tools represent to the developer how the application will function in terms of its sections and the functionality of each section.

The application developer logic 100 creates first and second sections 112 and 114 in the application 26. The first section 112 corresponds to the first sections 62, 88 and 104. The second section 114 corresponds to the second sections 76, 92 and 106. The application developer logic 100 compiles the tools of the first section 104 as a first routine 118 and enters the first routine 118 within the first section 112 of the application 26. The application developer logic 100 compiles the tools of the second section 106 as a second routine 120 and enters the second routine 120 in the second section 114.

The power limiter logic 102 retrieves the second power profile 86 corresponding to the first section 88 from the selected data 52 and enters the second power profile 86 as a second power profile 122 as part of the first section 112 of the application 26. The power limiter logic 102 also retrieves the first power profile 90 corresponding to the second section 92 in the selected data 52 and enters the first power profile 90 as a first power profile 124 in the second section 114. The second power profile 122 of the first section 112 includes the first clock speed 40 for the first processor and second clock speed 42 for the second processor. The first power profile 124 of the second section 114 includes the first clock speed 34 for the first processor and the second clock speed 36 for the second processor. The first section 112 and the second section 114 thus each has a respective routine 118 and 120 and each has respective clock speeds for the first and second processors that are selected to be intent-specific and that are limited by the power limiter logic 102 to limit the generation of more than a predetermined amount of heat per unit time for the processors in combination.

Figure 2:
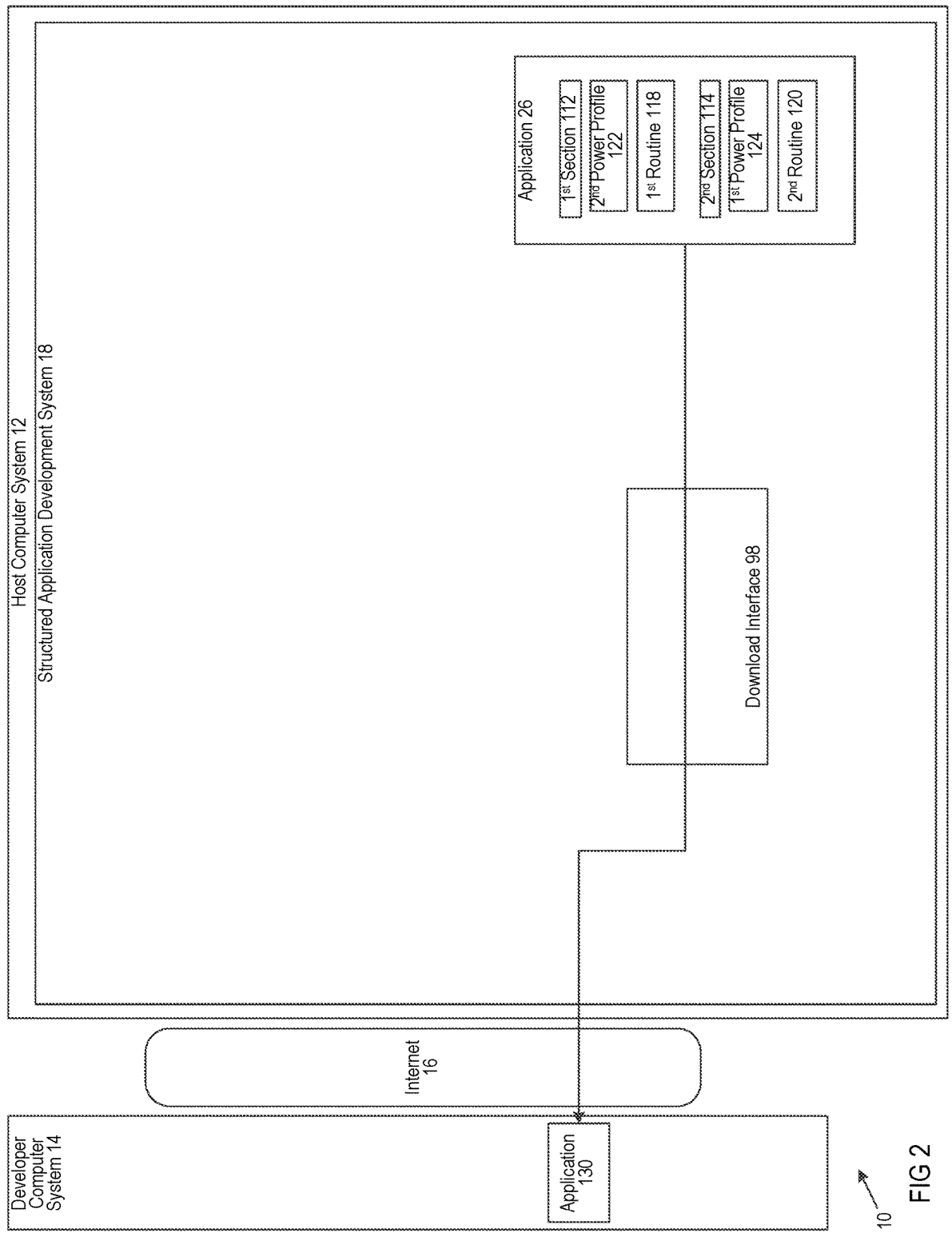
FIG. 2 is a block diagram similar to FIG. 1 showing a download interface.

As shown in FIG. 2, the structured application development system 18 further includes a download interface 98. The developer at the developer computer system 14 retrieves the download interface 98 from the host computer system 12 and displays the download interface 98 on the display of the developer computer system 14. The developer, using the developer computer system 14, interacts with the download interface 98 to download the application 26 from the host computer system 12 on to the developer computer system 14. The application 26 then resides as an application 130 on the developer computer system 14.

Figure 3:
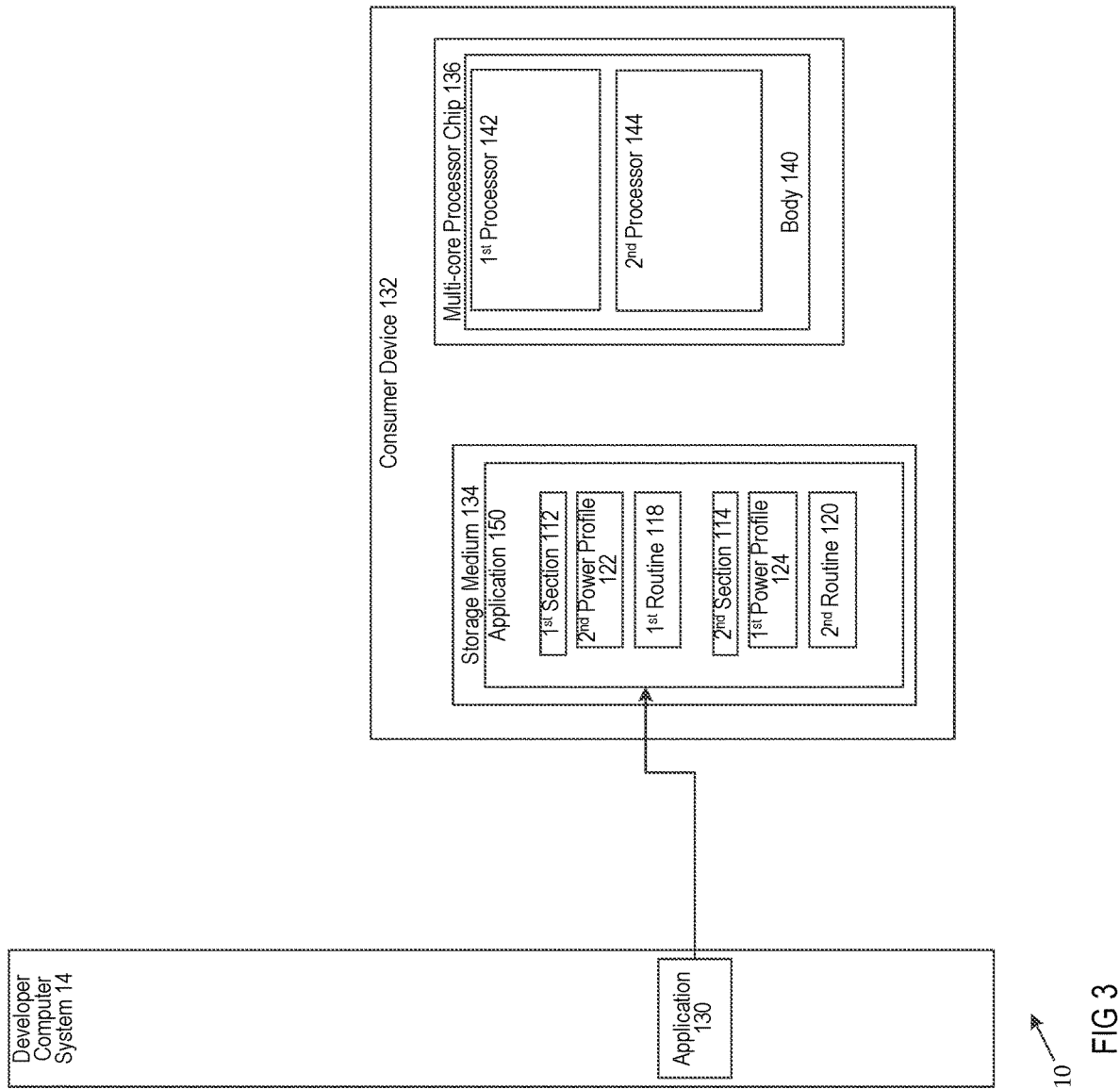
FIG. 3 is a block diagram of the developer computer system and a consumer device.

FIG. 3 shows the developer computer system 14 and a consumer device 132. The consumer device 132 has a storage medium 134 and a multi-core processor chip 136. The multi-core processor chip 136 has a body 140 and first and second processors 142 and 144 manufactured in and on the body 140. The body 140 includes a semiconductor material such as silicon, germanium, gallium arsenide or the like and may include further components and materials that are commonly known in the art of semiconductor packaging. The first and second processors 142 and 144 include transistors and other electrical components that are interconnected to form logic devices. The first and second processors 142 and 144 are connected to external power sources and have clocks that can be set at preselected clock speeds. The developer uses the developer computer system 14 to create a copy of the application 130 and store the copy of the application as an application 150 on the storage medium 134. The consumer device 132 is then programmed with the application 150. In a bulk manufacturing process, the application 130 may first be transferred to a programmer that is used to program multiple consumer devices for scaled distribution.

Figure 4:
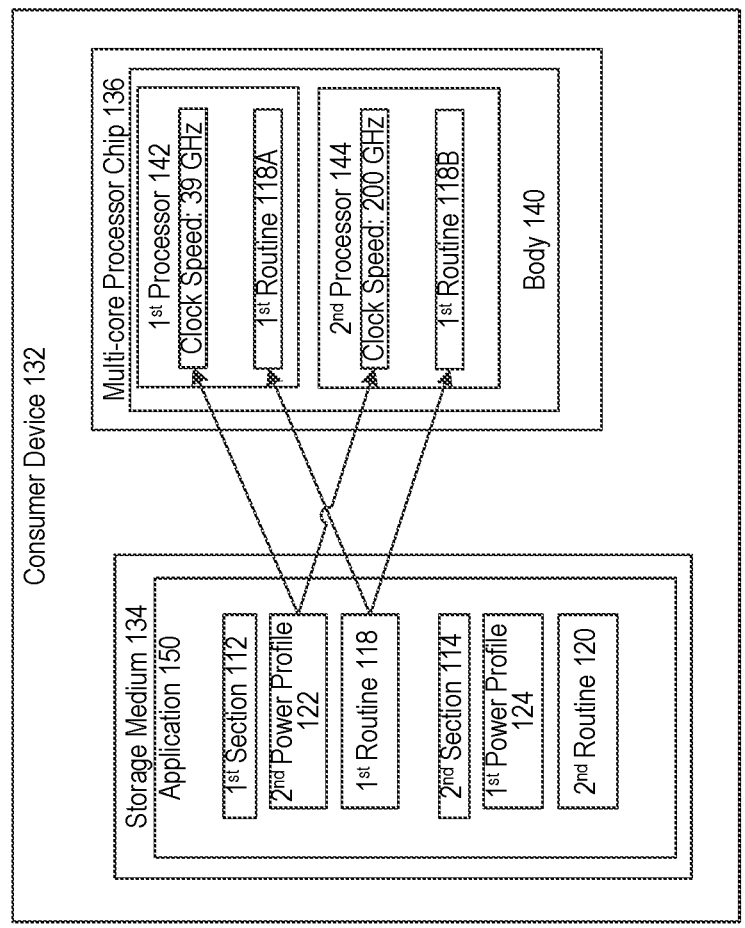
FIG. 4 is block diagram illustrating functioning of an application on the consumer device.
Figure 5:
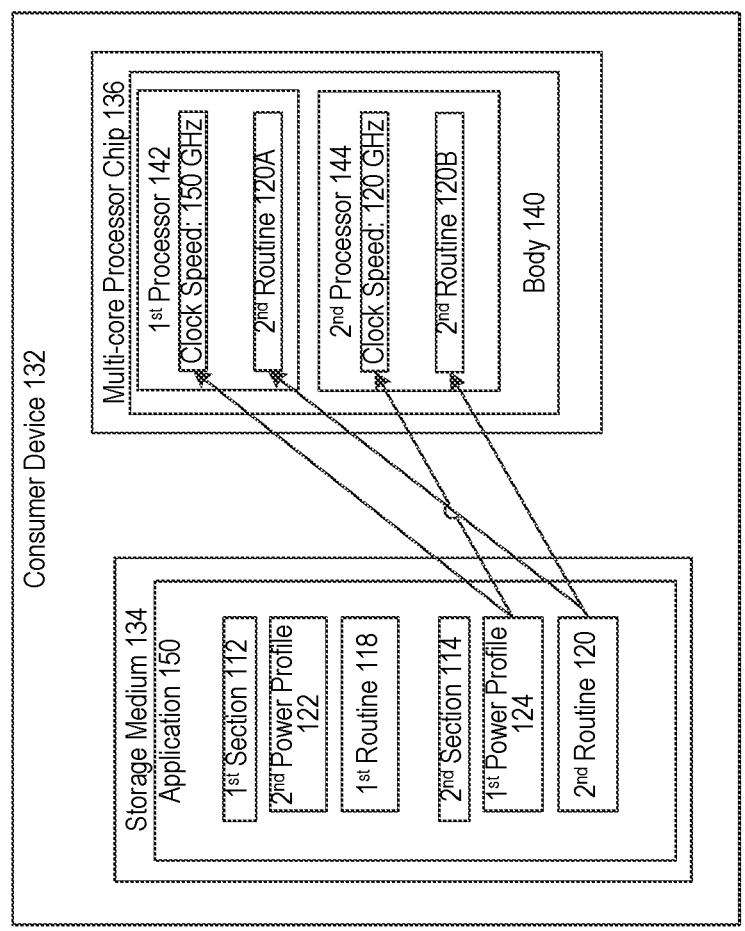
FIG. 5 is a block diagram illustrating further functioning of the application on the consumer device.

FIGS. 4 and 5 illustrate how the application 150 executes on the consumer device 132. In FIG. 4, the first section 112 of the application 150 executes. The clock speeds of the second power profile 122 are used to set the clock speeds of the first and second processors 142 and 144. By way of example, the second power profile 122 includes a first clock speed of 39 GHz for the first processor 142 and a second clock speed for the second processor 144 of 200 GHz. The first and second processors 142 and 144 execute the first routine 118. Sections of the first routine 118 that are executed by the first processor 142 are represented by a first routine 118A and sections of the first routine 118 that are executed by the second processor 144 are represented by a first routine 118B. The first routine 118A and 118B may be partially executed at the same time or may have portions that interweave so that portions of the first routine 118A and the first routine 118B alternate with one another. The clock speeds at which the first routine 118A and the first routine 118B are executed by the first processor 142 and the second processor 144 originate from the power profile data library 20 in FIG. 1 and due to the logic that is provided to the developer and not provided to the developer, the developer is prevented from selecting different clock speeds.

FIG. 5 shows the execution of the second section 114. The first power profile 124 is used to set the clock speeds of the first processor 142 and the second processor 144. By way of example, the first processor 142 has a clock speed of 150 GHz and the second processor 144 has a clock speed of 120 GHz. The second routine 120 is executed by the first and second processors 142 and 144. Components of the second routine 120 that are executed by the first processor 142 are represented by a second routine 120A and components of the second routine 120 that are executed by the second processor 144 are represented as a second routine 120B.

FIGS. 6A, 6B and 6C show that three different processors may have three different heat generation curves. In each figure, heat generated per unit time in Watts is shown on the vertical axis and performance as a percentage of maximum clock speed is shown on the horizontal axis. The heat generation curve for the processor shown in FIG. 6A initially increases slowly, followed by an acceleration and then a deceleration. The heat generation curve for the processor in FIG. 6B initially increases rapidly followed by a gradual deceleration. The heat generation curve for the processor shown in FIG. 6C increases linearly. The heat generation curves shown in FIGS. 6A, 6B and 6C have to be considered when calculating a total amount of heat generated by the three processors.

FIGS. 7A, 7B and 7C show three different power profiles that may be stored. FIG. 7A shows a power profile wherein priority is given to a first of the processors. The first processor is permitted to run at 100% of its maximum clock speed. The clock speeds of the second and third processors are reduced to below 100% of their maximum clock speeds. FIG. 7B shows a power profile wherein priority is given to a third processor. The third processor is set to run at a clock speed that is equal to 100% of its maximum clock speed while the clock speeds of the first and second processors are reduced to below 100% of their maximum clock speeds. FIG. 7C shows a power profile wherein performance is balanced. The clock speeds of all three processors are reduced to below 100% of their maximum clock speeds.

FIGS. 8A, 8B and 8C illustrate the heat generated by the power profiles in FIGS. 7A, 7B and 7C, respectively. Each processor generates heat according to its respective heat generation curve in FIGS. 6A, 6B and 6C. The total amount of heat generated per unit time for all three processors is the same in FIGS. 8A, 8B and 8C. Although the total amount of heat generated per unit time is the same, a small variation may be possible without departing from the scope and spirit of the invention. For example, the total amount of heat generated per unit time by a first power profile may be less than 10% higher or less than 10% lower than the total amount of heat generated per unit time following a second power profile. A third power profile may generate heat per unit time that is less than 10% higher or lower than that of the first power profile.

The consumer device 132 described herein may be a mixed reality system as described in U.S. patent application Ser. No. 14/331,218 which is incorporated by reference herein.

Figure 9:
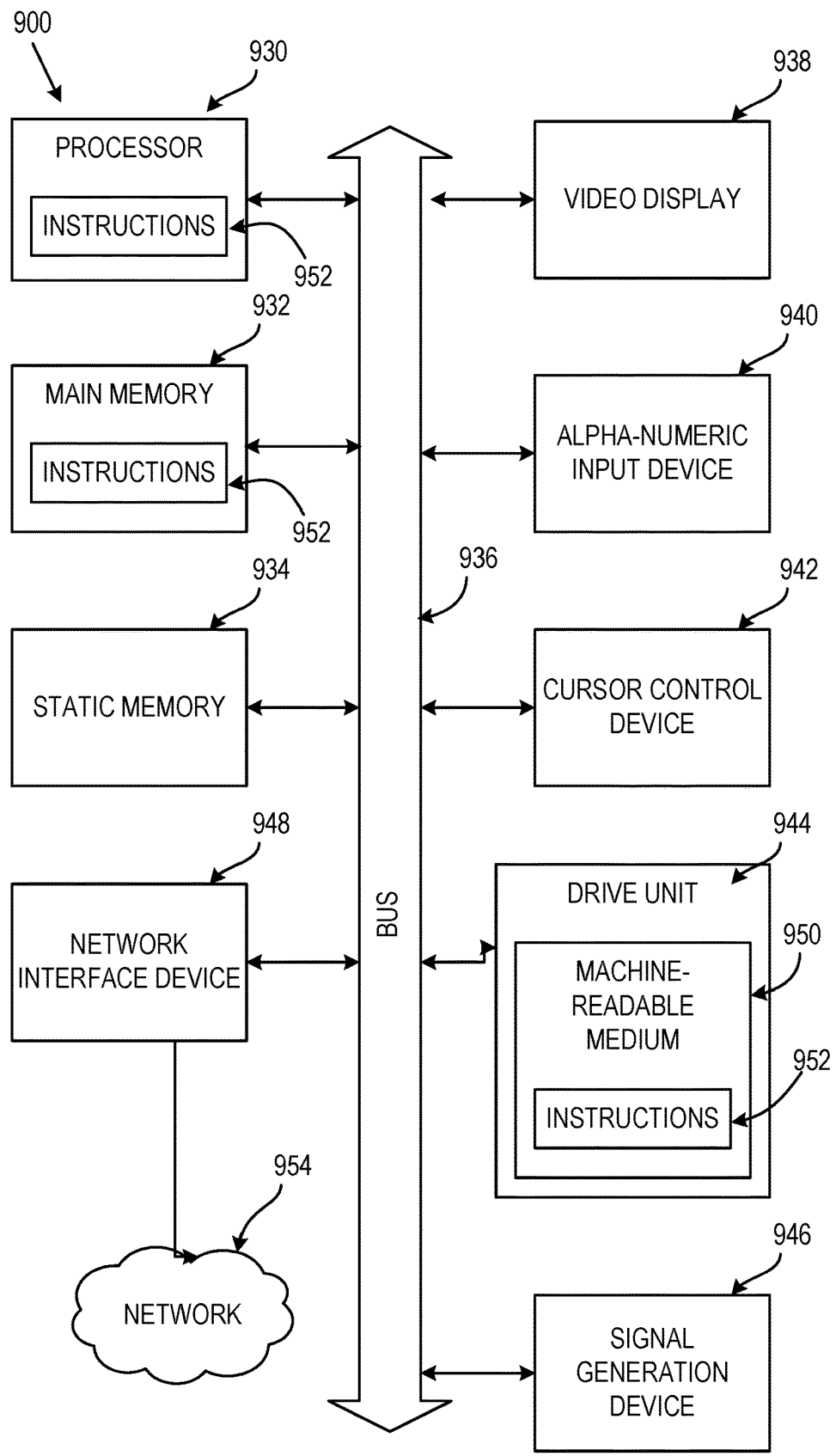
FIG. 9 is a block diagram of a machine in the form of a computer system forming part of the network environment.

FIG. 9 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 930 (e.g., a central processing unit (CPU), a graphics processing unit (GPU), or both), a main memory 932 (e.g., read-only memory (ROM), flash memory, dynamic random access memory (DRAM) such as synchronous DRAM (SDRAM) or Rambus DRAM (RDRAM), etc.), and a static memory 934 (e.g., flash memory, static random access memory (SRAM, etc.), which communicate with each other via a bus 936.

The computer system 900 may further include a video display 938 (e.g., a liquid crystal displays (LCD) or a cathode ray tube (CRT)). The computer system 900 also includes an alpha-numeric input device 940 (e.g., a keyboard), a cursor control device 942 (e.g., a mouse), a disk drive unit 944, a signal generation device 946 (e.g., a speaker), and a network interface device 948.

The disk drive unit 944 includes a machine-readable medium 950 on which is stored one or more sets of instructions 952 (e.g., software) embodying any one or more of the methodologies or functions described herein. The software may also reside, completely or at least partially, within the main memory 932 and/or within the processor 930 during execution thereof by the computer system 900, the memory 932 and the processor 930 also constituting machine readable media. The software may further be transmitted or received over a network 954 via the network interface device 948.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A host computer system comprising:
a host computer processor;
a computer-readable medium connected to the host computer processor; and
a set of instructions on the computer-readable medium, the set of instructions being readable by the host computer processor and including:
a structured application development system having:
a power profile data library on the computer-readable medium that includes:
a first reference intent;
a first power profile associated with the first reference intent and having a respective first maximum clock speed for a first processor and a respective second maximum clock speed for a second processor;
a second reference intent; and
a second power profile associated with the second reference intent and having a respective first maximum clock speed for the first processor and a respective second maximum clock speed for the second processor, the first maximum clock speed of the first power profile being different from the first maximum clock speed for the second power profile;
the structured application development system has:
a structured intent system includes:
a set of target intents including first and second target intents;
an intent selection interface to select first and second sections and select a target intent from the set of target intents for association with the first and second sections respectively; and
a power profile lookup that determines a power profile for each of the first and second sections from the power profile library by matching the target intent selected for the respective first or second section and a reference intent to associate a power profile;
a developer kit that includes:
a set of tools;
a tool selector interface to select tools from the set of tools and arrange the tools in a customizable order for the first and second sections;
an application developer logic configured to generate an application based on the order that the tools are arranged for the first and second sections, the application being executable by a processor of a consumer device; and
a power limiter logic that, due to associating each of the first and second sections with a respective power profile, is configured to limit the first and second processors to the maximum clock speeds of the respective power profile for the respective section when the respective section is executed on the consumer device having the first and second processors.

2. The host computer system of claim 1, wherein the intent selection interface is accessible over a network from a developer computer system to select the first and second sections and select the target intent from the set of target intents for association with the first and second sections respectively.

3. The host computer system of claim 1, wherein the intent selection interface is accessible over a network from a developer computer system to select the tools from the set of tools and arrange the tools in the customizable order for the first and second sections.

4. The host computer system of claim 1, wherein the power limiter logic inserts the maximum clock speeds of the respective power profile for the respective first or second section into the application.

5. The host computer system of claim 4, wherein the structured application development system further has:
a download interface that is accessible over a network from a developer computer system to download the application with the maximum clock speeds of the respective power profile for the respective first or second section in the application from the host computer system onto the developer computer system.

6. The host computer system of claim 1, wherein and the second maximum clock speed of the first power profile is different from the second maximum clock speed for the second power profile.

7. The host computer system of claim 1, wherein the second maximum clock speed for the first power profile is the same as the second maximum clock speed for the second power profile.

8. A method of operating a host computer system comprising:
storing a power profile data library on a computer-readable medium, the power profile data library including:
a first reference intent;
a first power profile associated with the first reference intent and having a respective first maximum clock speed for a first processor and a respective second maximum clock speed for a second processor;
a second reference intent; and
a second power profile associated with the second reference intent and having a respective first maximum clock speed for the first processor and a respective second maximum clock speed for the second processor, the first maximum clock speed of the first power profile being different from the first maximum clock speed for the second power profile;
storing a set of target intents including first and second target intents on the computer-readable medium;
displaying, with a host computer processor, an intent selection interface to select first and second sections and select a target intent from the set of target intents for association with the first and second sections respectively;
executing, with the host computer processor, a power profile lookup that determines a power profile for each of the first and second sections from the power profile library by matching the target intent selected for a respective first or second section and a reference intent to associate a respective power profile;
storing a set of tools on the computer-readable medium;
displaying, with the host computer processor, a tool selector interface to select tools from the set of tools and arrange the tools in a customizable order for the first and second sections;
executing, with the host computer processor, an application developer logic that generates an application based on the order that the tools are arranged for the first and second sections, the application being executable by a processor of a consumer device; and
executing, with the host computer processor, a power limiter logic that, due to associating each of the first and second sections with a respective power profile, limits the first and second processors to the maximum clock speeds of the respective power profile for the respective first or second section when the respective first or second section is executed on a consumer device having the first and second processors.

9. A consumer device that includes:
a multi-core processor chip having a body and a plurality of processors on the body;
a computer-readable medium connected to the processors; and
an application on the computer-readable medium, the application having:
a first section, the first section having:
a first routine that is executable by the processors; and
a first power profile having a respective maximum clock speed for each one of the processors; and
a second section, the second section having:
a second routine that is executable by the processors; and
a second power profile having a respective maximum clock speed for each one of the processors so that at least one of the processors has a maximum clock speed that changes from the first section to the second section, wherein the processors jointly generate a first amount of heat per unit time during the first section and a second amount of heat during the second section and the second amount of heat is less than 10% different than the first amount of heat.

10. The consumer device of claim 9, wherein the second amount of heat is the same as the first amount of heat.

11. The consumer device of claim 9, wherein the first and second processors have different heat generation curves.

12. The consumer device of claim 9, wherein the processors include at least a first processor and a second processor, the second processor generating less heat per unit time than the first processor during the first section and more heat than the first processor during the second section, wherein the processors include at least a third processor, the third processor generating less heat per unit time than the first processor during the first section and more heat than the first processor during the second section.

13. The consumer device of claim 9, further comprising:
a third section, the third section having:
a third routine that is executable by the processors; and
a third power profile having a respective maximum clock speed for each one of the processors so that at least one of the processors has a maximum clock speed that changes from the first section to the third section, wherein the processors jointly generate a third amount of heat per unit time during the third section and the third amount of heat is less than 10% different than the first amount of heat.

14. A method of operating a consumer device that includes:
storing an application on the computer-readable medium connected to a plurality of processors on a body of a multi-core processor chip, the application having a first section and second section;
executing the first section with the processors, the first section having:
a first routine that is executable by the processors; and
a first power profile having a respective maximum clock speed for each one of the processors; and
executing the second section with the processors, the second section having:
a second routine that is executable by the processors; and
a second power profile having a respective maximum clock speed for each one of the processors so that at least one of the processors has a maximum clock speed that changes from the first section to the second section, wherein the processors jointly generate a first amount of heat per unit time during the first section and a second amount of heat during the second section and the second amount of heat is less than 10% different than the first amount of heat.

15. A consumer device that includes:
first and second processors;
a computer-readable medium connected to the processors; and
an application on the computer-readable medium, the application having:
a first section, the first section having:
a first routine that is executable by the first and second processors; and a first power profile, the first power profile having first and second maximum clock speeds for the first and second processors; and a second section, the second section having:
   a second routine that is executable by the first and second processors; and
   a second power profile, the second power profile having first and second maximum clock speeds for the first and second processors, the first maximum clock speed of the first power profile being different from the first maximum clock speed for the second power profile and the second maximum clock speed of the first power profile be different from the second maximum clock speed for the second power profile so that at least one of the processors has a maximum clock speed that changes from the first section to the second section, wherein the processors jointly generate a first amount of heat per unit time during the first section and a second amount of heat during the second section and the second amount of heat is less than 10% different than the first amount of heat.

16. The consumer device of claim 15, further comprising:
a multi-core processor chip holding the first and second processors.

17. The consumer device of claim 15, wherein the first and second processors have different heat generation curves.

* * * * *